US009203791B1

(12) United States Patent  
Olomskiy

(10) Patent No.: US 9,203,791 B1  
(45) Date of Patent: Dec. 1, 2015

(54) SECRET CHAT MODE FOR HIDDEN DIALOGUE

(71) Applicant: MORVEN MANAGEMENT LIMITED, Road Town, Tortola (VG)

(72) Inventor: Evgeny Vladimirovich Olomskiy, Vladivostok (RU)

(73) Assignee: MORVEN MANAGEMENT LIMITED, Road Town (VG)

( * ) Notice: Subject to any disclaimer, the term of this patent is extended or adjusted under 35 U.S.C. 154(b) by 0 days.

(21) Appl. No.: 14/583,001

(22) Filed: Dec. 24, 2014

(51) Int. Cl.
| G06F 21/00 | (2013.01) |
| H04L 12/58 | (2006.01) |
| H04L 29/06 | (2006.01) |
| G06F 21/82 | (2013.01) |
| G06F 21/60 | (2013.01) |

(52) U.S. Cl.
CPC ............... *H04L 51/12* (2013.01); *G06F 21/60* (2013.01); *G06F 21/82* (2013.01); *H04L 63/083* (2013.01)

(58) Field of Classification Search
CPC ..... G06F 21/60; G06F 21/62; G06F 21/6245; G06F 21/629; G06F 21/82; G06F 21/84
See application file for complete search history.

(56) References Cited

U.S. PATENT DOCUMENTS

| 7,032,007 | B2 | 4/2006 | Fellenstein et al. |
| 7,194,536 | B2 | 3/2007 | Fellenstein et al. |
| 7,421,661 | B1 | 9/2008 | Canfield et al. |
| 7,444,379 | B2 | 10/2008 | Becker et al. |
| 7,984,174 | B2 | 7/2011 | Rideout |
| 8,082,302 | B2 | 12/2011 | Becker et al. |
| 8,713,452 | B2 | 4/2014 | Scott |
| 8,825,778 | B2 | 9/2014 | DeLuca et al. |
| 8,856,663 | B2 | 10/2014 | Scott |
| 2003/0105815 | A1 | 6/2003 | Gusler et al. |
| 2003/0105822 | A1 | 6/2003 | Gusler et al. |
| 2005/0060281 | A1 | 3/2005 | Bucher et al. |
| 2005/0125484 | A1 | 6/2005 | Bucher et al. |

(Continued)

FOREIGN PATENT DOCUMENTS

CN 103685137 A 3/2014

OTHER PUBLICATIONS

Khazan, R. et al., "GROK Secure multi-user Chat at Red Flag Mar. 2007," Military Communications Conference, 2008, MILCOM 2008. IEEE, pp. 1, 7, 16-19, Nov. 2008.

(Continued)

*Primary Examiner* — Edward Zee
(74) *Attorney, Agent, or Firm* — John W. Branch; Lowe Graham Jones PLLC

(57) ABSTRACT

Embodiments are directed towards hiding selected dialogues and/or contacts from display on a client computer while they are in a secret chat mode (SCM). A dialogue may be selected by a user, such as through the dialogue or through a list of previous dialogues. SCM may be activated by a user setting/providing a password. Activation of SCM may hide the dialogue and/or the contacts associated with the dialogue from being displayed. SCM for a hidden dialogue may be deactivated when user-provided password matches the set password. Deactivation of SCM may cause the hidden dialogue associated with that password to be unhidden and displayed. A notification that received password is valid may be displayed on the client computer regardless of whether the received password is valid or invalid. A replacement notification may be generated and provided to the user for received messages associated with hidden dialogues in SCM.

26 Claims, 14 Drawing Sheets

(56) References Cited

U.S. PATENT DOCUMENTS

| | | | |
|---|---|---|---|
| 2005/0223075 A1 | 10/2005 | Swearingen et al. | |
| 2006/0161853 A1 | 7/2006 | Chen et al. | |
| 2006/0167991 A1 | 7/2006 | Heikes et al. | |
| 2008/0010598 A1 | 1/2008 | Smilowitz et al. | |
| 2008/0307322 A1 | 12/2008 | Stochosky et al. | |
| 2009/0006856 A1* | 1/2009 | Abraham et al. | 713/183 |
| 2009/0215476 A1 | 8/2009 | Tysowski | |
| 2011/0287741 A1* | 11/2011 | Prabhu | 455/411 |
| 2012/0028659 A1* | 2/2012 | Whitney et al. | 455/466 |
| 2012/0259925 A1 | 10/2012 | Braudes | |
| 2012/0260189 A1 | 10/2012 | Howard et al. | |
| 2013/0005370 A1 | 1/2013 | Tysowski | |
| 2013/0185363 A1 | 7/2013 | DeLuca et al. | |
| 2013/0262594 A1 | 10/2013 | Bastide et al. | |
| 2013/0308628 A1 | 11/2013 | Marueli et al. | |
| 2014/0189522 A1 | 7/2014 | Scott | |
| 2014/0242949 A1* | 8/2014 | Burch et al. | 455/411 |

OTHER PUBLICATIONS

Weigelt, J.H. et al., "Securing asynchronous transfer mode based networks through the use of encryption," Electrical and Computer Engineering, 1995. Canadian Conference on, vol. 1, pp. 426,431 vol. 1, Sep. 5-8, 1995.

* cited by examiner

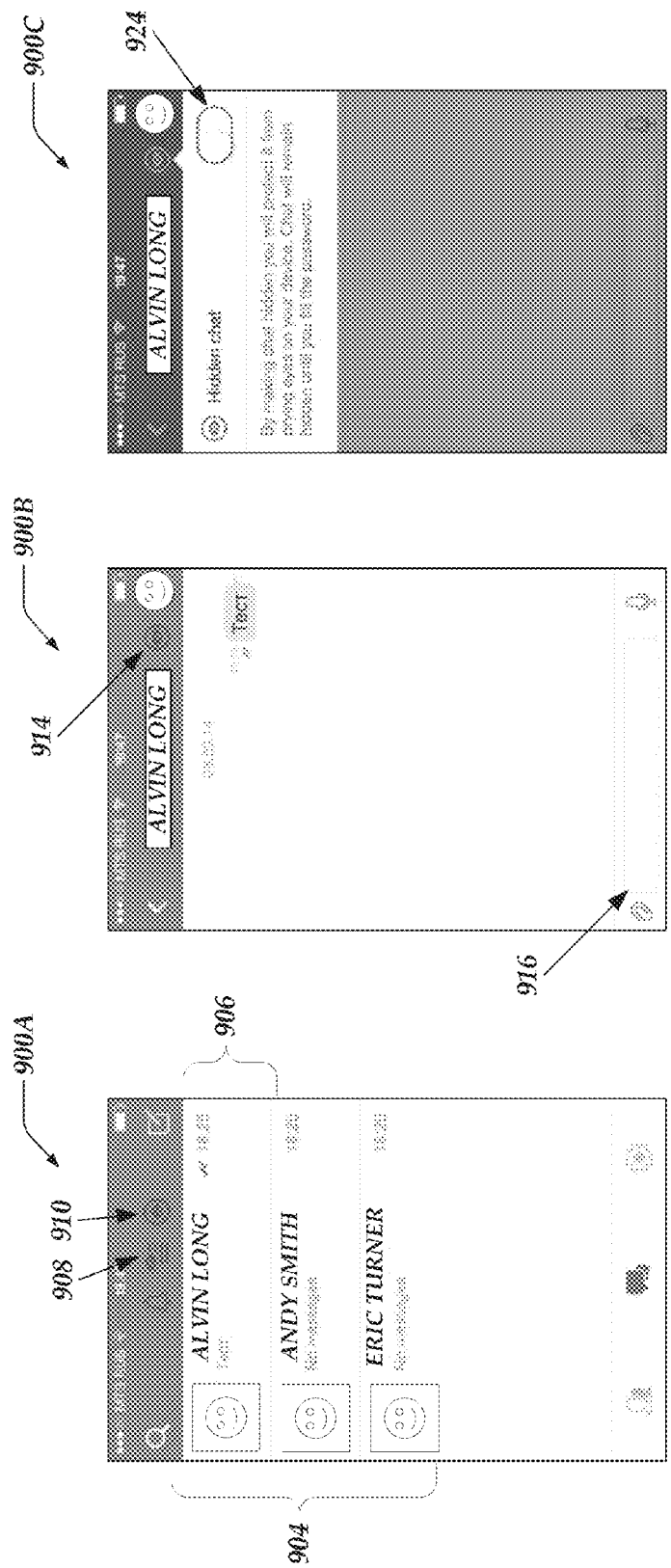

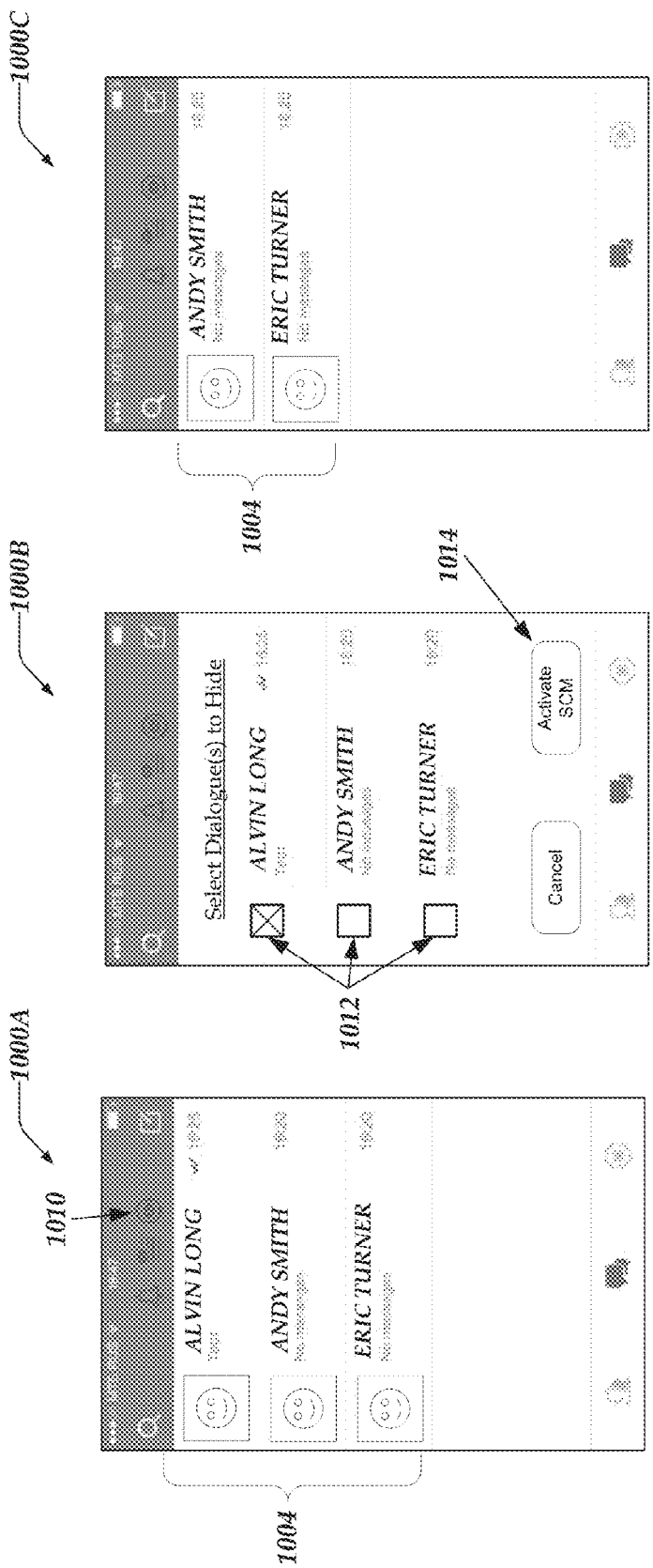

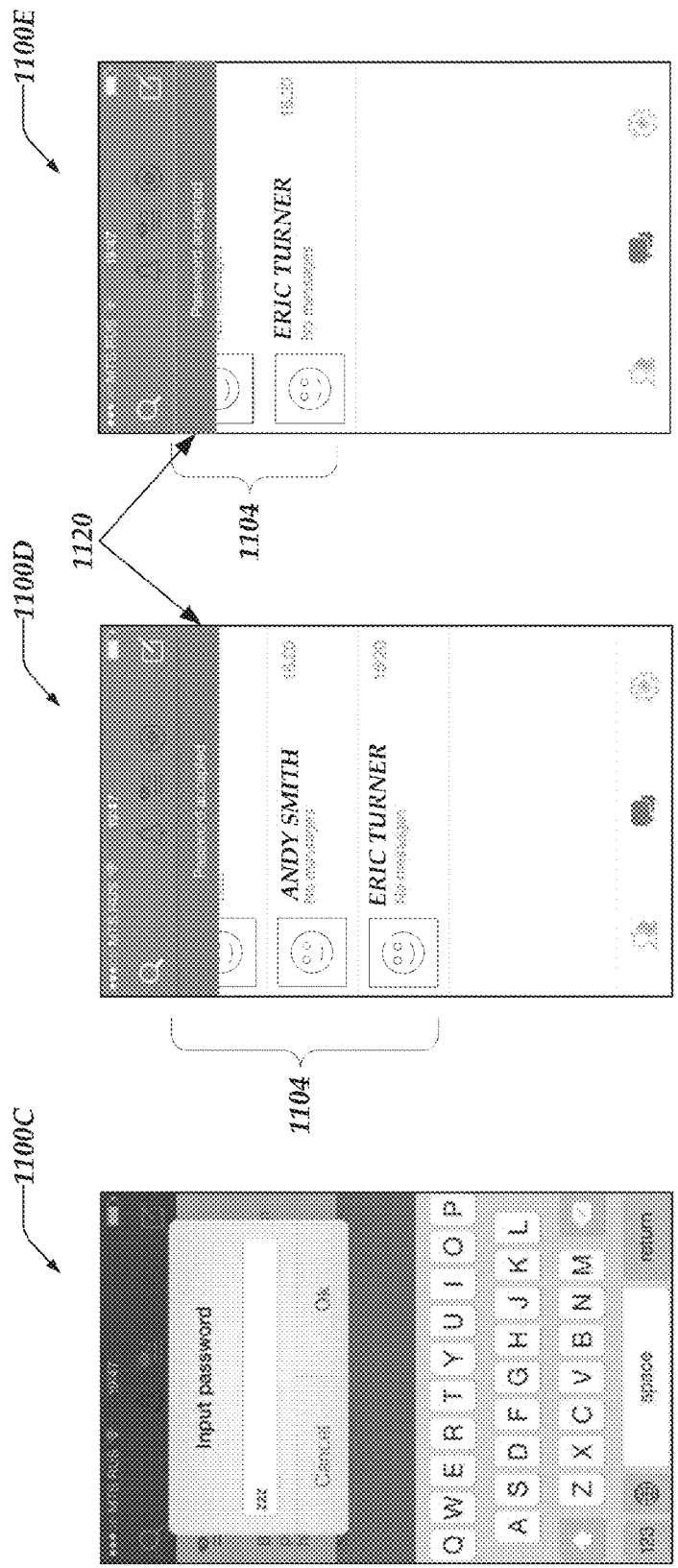

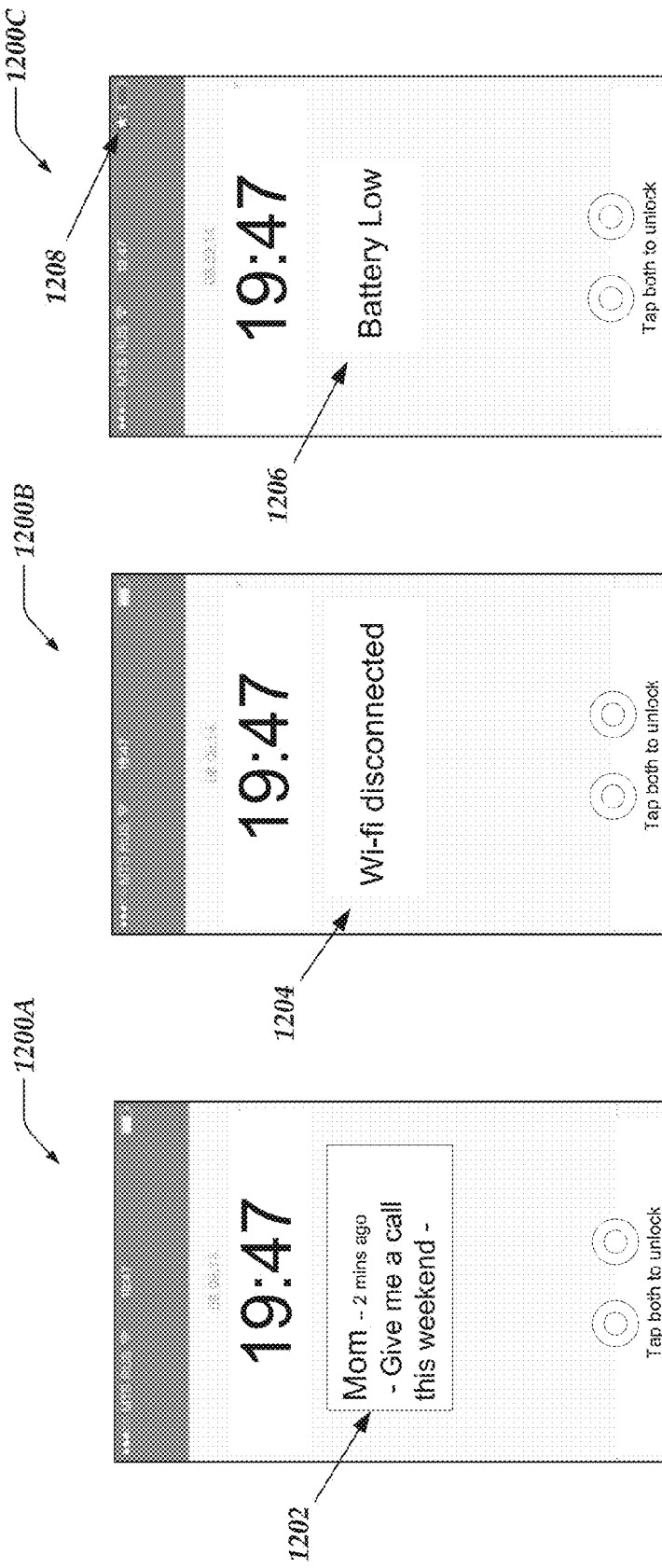

SECRET CHAT MODE FOR HIDDEN DIALOGUE

TECHNICAL FIELD

The present invention relates generally messaging services, and more particular, but not exclusive, to hiding dialogue from one or more contacts while in secret chat mode.

BACKGROUND

Online instant messaging (IM) applications allow users to chat with each other via the internet. IM applications usually include a list of dialogues and chat history between a user and his/her contacts. Generally each and every dialogue is reflected in the dialogue list and saved to a chat history until the user deletes it. However, some users of IM applications may not want others to see some of the dialogues and/or people with whom the user is communicating with. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like components throughout the various figures unless otherwise specified.

For a better understanding of the present invention, reference will be made to the following Detailed Description, which is to be read in association with the accompanying drawings, wherein:

FIGS. 9A-9E show use case screenshot examples of embodiments for establishing a secret chat mode for a selected dialogue;

FIGS. 10A-10C show use case screenshot examples of alternative embodiments for establishing a secret chat mode for a selected dialogue;

FIGS. 11A-11E show use case screenshot examples of embodiments for unlocking a secret chat mode for at least one dialogue; and FIGS. 12A-12C show use case screenshot examples of embodiments for providing replacement notifications for messages associated with a dialogue in secret chat mode.

DETAILED DESCRIPTION

Figure 1:
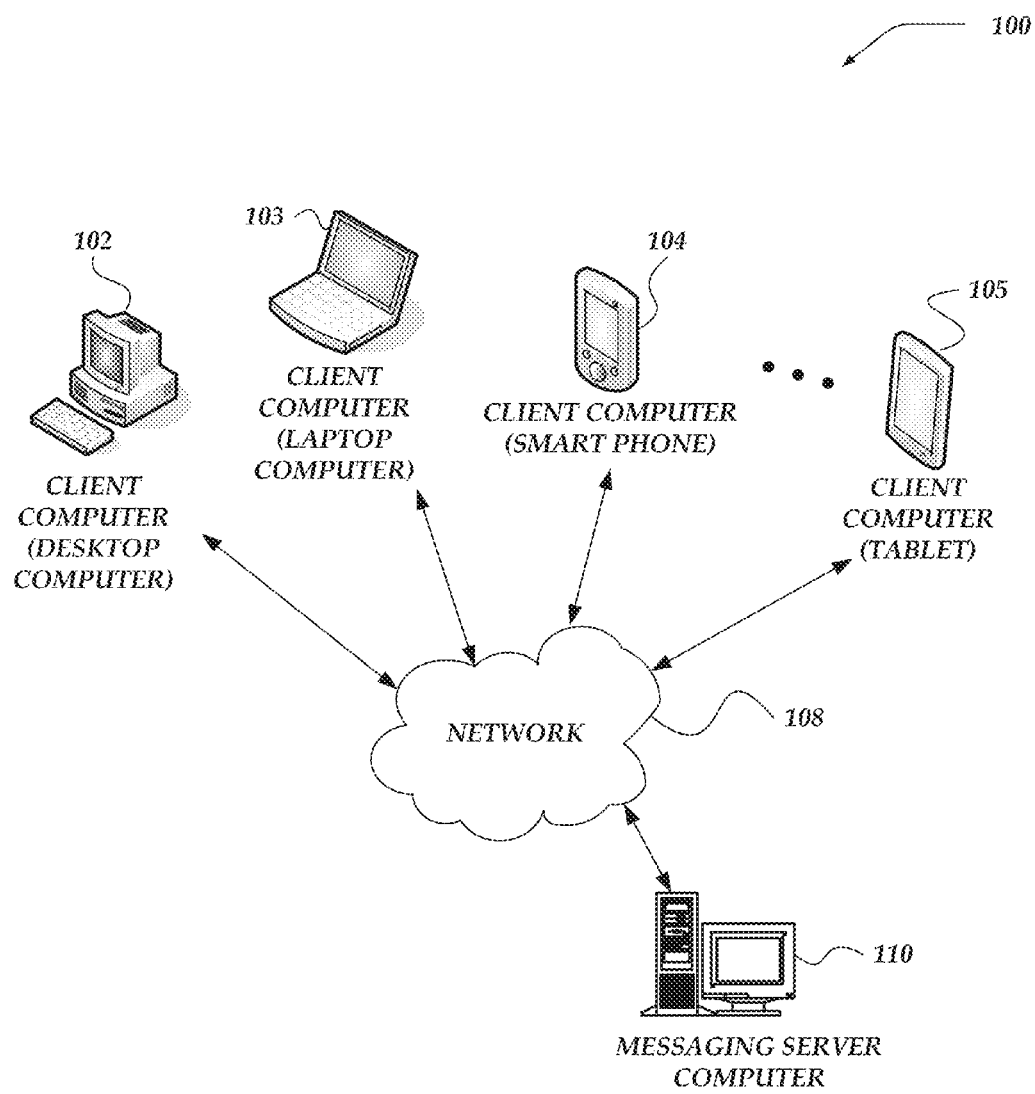
FIG. 1 is a system diagram of an environment in which embodiments of the invention may be implemented.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the tem "dialogue" refers to an online conversation between a user of a client computer and one or more contacts of the user. A dialogue may include a history of previous messages sent to and/or from the user. As described herein, a dialogue may be associated with a secret chat mode, such that the dialogue is hidden from display on the client computer. In some embodiments, when hidden from display, the dialogue may be omitted from a list of dialogues. As used herein, the term "list of dialogues" refers to one or more current and/or historic dialogues that the user has been engaged with (e.g., sent or received messages). In some other embodiments, a contact associated with a hidden dialogue may be removed from a contact list, unless that contact is associated with a non-hidden dialogue (or a hidden dialogue with a secret chat mode that has been temporarily suspended).

As used herein, the term "message" refers to any of a variety of messaging formats, or electronic communications forms between users, including but not limited to email, SMS, IM, MMS, IRC, RSS feeds, or the like.

As used herein, the term "secret chat mode" or "SCM" refers to a status of one or more dialogues of a user of a client computer where the one or more dialogues hidden from display on the client computer. The user may be the person whose client computer is enabled to execute SCM or the person who enables SCM on the client computer. In some embodiments, SCM may be a mode of operation of an application executing on a client computer such that dialogues associated with the SCM are hidden from display. In various embodiments, a dialogue in SCM may be referred to as a hidden dialogue.

In various embodiments, SCM may be associated with one or more contacts. In this way, dialogues associated with the contact may also be in SCM. Enabling SCM for contacts can allow a user to hide who they are talking to, not just the conversations/dialogues.

In at least one of various embodiments, messages associated with a dialogue in SCM may not be displayed to the user upon receipt. These messages may be referred to as secret messages. In various embodiments, notifications associated with a secret message may not be displayed on the client computer. But rather, a replacement notification with information unrelated to the secret message may be displayed.

As used herein, the term "notification" refers to an act by a client computer to provide information to a user. Notifications may be visual, audible, or tactile. For example, in some embodiments, notifications may be visual text and/or graphics that are displayed on the client computer. In other embodiments, notifications may be a noise alert with various beeps, tones, songs, verbal words/phrases, or other acts that a user can hear. In some other embodiments, notifications may be tactile, e.g., vibrations of the client computer or other physical acts that a user touching the client computer can feel. In various embodiments, notifications may be provided to a user in response to receipt of a message.

As used herein, the term "replacement notification" refers to a notification that is generated in response to receipt of a message that is associated with a dialogue in secret chat mode (i.e., hidden dialogue). This message may be referred to as a secret message. The replacement notification may include information that is different and/or unrelated to the information in the secret message. In various embodiments, a replacement notification may be one or more of a variety of different types of notifications.

Examples of replacement notifications may include, but are not limited to, other message notifications (e.g., from a contact unassociated with the hidden dialogue), system notifications (e.g., battery low, error, or the like), push notifications from another application (i.e., an application other than the messaging application), or other notifications. In some embodiments, the replacement notification may be pre-set or predetermined. In other embodiments, the user may be enabled to select, modify, or otherwise customize replacement notifications. For example, the user may select which replacement notification to use for which hidden dialogue.

Various examples of replacement notifications may include, but are not limited to, message notification from "mom," redisplay of a notification for a most recently received message associated with a non-hidden dialogue, low battery notification, three vibration pulses, one vibration pulse with the time displayed using red colored font, or the like. In some embodiments, a notification may include a symbol or additional graphical display to distinguish between a real notification and a replacement notification. For example, a low battery replacement notification may include a lightning bolt next to the battery icon, whereas a real low battery notification may only include the battery icon without the lightning bolt. It should be recognized that the replacement notification may be virtually any client computer indicator that does not identify a secret message or include information associated with a secret message or its hidden dialogue. Also, it should be recognized that replacement notifications may change over-time, per secret message, based on a location of the network computer, based on other characteristics of the network computer, or the like, so that an observer (other than the user) of the client computer may not recognize the replacement notification or become suspicious of hidden messages. Because if a client computer is continually providing a low battery notification while it is plugged in, a casual observer may become suspicious of this type of activity, which is what the use may be trying to avoid.

As used herein, the term "password" refers to an authentication mechanism for activating and/or deactivating SCM. Passwords may include character strings (e.g., typed-in characters), retinal scanning, fingerprints, voice recognition, facial recognition, other biometric authentication, personalized radio-frequency identification (RFID) chips, or the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detail description this is presented later.

Briefly stated, embodiments are directed towards a messaging system that enables a user to hide selected dialogues and/or contacts from display on a client computer. At least one contact of the user and/or at least one dialogue between the user and the at least one contact may be determined. In various embodiments, the contacts and/or the dialogues may be selected by the user. In some embodiments, at least one dialogue may be selected by opening at least one of an existing dialogue or a new dialogue between the user and the at least one contact of the user. In other embodiments, a list of previous dialogues may be provided to the user, where the user may select one or more of the previous dialogues in the list.

At least one password for the at least one dialogue may be determined. As described herein, the at least one password may include one or more character strings, retinal scans, fingerprints, voice recognition, facial recognition, or the like. In various embodiments, the user may provide and/or otherwise set the password. When the at least one password for the at least one dialogue is received from the user, a secret chat mode (SCM) for the at least one dialogue may be activated. Activation of SCM may selectively hide at least one of the at least one dialogue or the at least one contact from display on the client computer. In some embodiments, the at least one contact may be hidden from display in a contact list while in SCM.

In various embodiments, the SCM for the at least one dialogue may be deactivated when the at least one password (i.e., a valid password) is received from the user during SCM for the at least one dialogue. Deactivation of the SCM may cause the at least one dialogue (and/or contact) to be unhidden and displayed on the client computer. In various embodiments, a notification that received password is valid may be displayed on the client computer regardless of whether the received password is valid or invalid. In some embodiments, if the received password includes a symbol that indicates a time duration for unhiding and displaying the at least one dialogue, the at least one dialogue may be automatically re-hidden after expiration of the time duration. In other embodiments, the SCM for the at least one dialogue may be automatically re-activating such that the dialogue is re-hidden after expiration of a pre-set time duration.

In various other embodiments, a message associated with the at least one dialogue in SCM may be received from a contact. A replacement notification for the message may be generated based on information that is different than information included in the message. The replacement notification may be provided to the user.

Illustrative Operating Environment

FIG. 1 shows components of one embodiment of an environment in which various embodiments of the invention may be practiced. Not all of the components may be required to practice the various embodiments, and variations in the arrangement and type of the components may be made without departing from the spirit or scope of the invention. As shown, system 100 of FIG. 1 may include messaging server computer 110, client computers 102-105, and network 108.

At least one embodiment of client computers 102-105 is described in more detail below in conjunction with client computer 200 of FIG. 2. Briefly, in some embodiments, client computers 102-105 may be configured to communicate with messaging server 110, and/or other network computers. In various embodiments, client computers 102-105 may be configured to provide messages (e.g., SMS text messages, instant messages, or the like) to other client computers and/or network computers. For example, a user may send an instant message from one client computer to another user of another client computer via a server computer.

In some embodiments, at least some of client computers 102-105 may operate over a wired and/or wireless network to communicate with other client computers, computing devices, or messaging server computer 110. Generally, client computers 102-105 may include computing devices capable of communicating over a network to send and/or receive information, perform various online and/or offline activities, or the like. It should be recognized that embodiments described herein are not constrained by the number or type of client computers employed, and more or fewer client computers—and/or types of client computers—than what is illustrated in FIG. 1 may be employed.

Devices that may operate as client computers 102-105 may include various computing devices that typically connect to a network or other computing device using a wired and/or wireless communications medium. Client computers 103-105 may be mobile devices and may include portable computers, and client computer 102 may include non-portable computers. Examples of client computer 102 may include, but are not limited to, desktop computers, personal computers, multiprocessor systems, microprocessor-based or programmable electronic devices, network PCs, or the like, or integrated devices combining functionality of one or more of the preceding devices. Examples of client computers 103-105 may include, but are not limited to, laptop computers (e.g., client computer 103), smart phones (e.g., client computer 104), tablet computers (e.g., client computer 105), cellular telephones, display pagers, Personal Digital Assistants (PDAs), handheld computers, wearable computing devices, or the like, or integrated devices combining functionality of one or more of the preceding devices. As such, client computers 102-105 may include computers with a wide range of capabilities and features.

Client computers 102-105 may access and/or employ various computing applications to enable users to perform various online and/or offline activities. Such activities may include, but are not limited to, generating documents, gathering/monitoring data, capturing/manipulating images, managing media, managing financial information, playing games, managing personal information, browsing the Internet, or the like. In some embodiments, client computers 102-105 may be enabled to connect to a network through a browser, or other web-based application.

Client computers 102-105 may further be configured to provide information that identifies the client computer. Such identifying information may include, but is not limited to, a type, capability, configuration, name, or the like, of the client computer. In at least one embodiment, a client computer may uniquely identify itself through any of a variety of mechanisms, such as an Internet Protocol (IP) address, phone number, Mobile Identification Number (MIN), media access control (MAC) address, electronic serial number (ESN), or other device identifier.

At least one embodiment of messaging server computer 110 is described in more detail below in conjunction with server computer 300 of FIG. 3. Briefly, in some embodiments, messaging server computer 110 may be operative to communicate with client computers 102-105 to enable users of client computers 102-105 to send and/or receive messages.

Network 108 may include virtually any wired and/or wireless technology for communicating with a remote device, such as, but not limited to, USB cable, Bluetooth, Wi-Fi, or the like. In some embodiments, network 108 may be a network configured to couple network computers with other computing devices, including client computers 102-105, messaging server computer 110, or the like. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or any combination thereof. In various embodiments, the network may be enabled to employ various forms of communication technology, topology, computer-readable media, or the like, for communicating information from one electronic device to another. For example, the network can include—in addition to the Internet—LANs, WANs, Personal Area Networks (PANs), Campus Area Networks, Metropolitan Area Networks (MANs), direct communication connections (such as through a universal serial bus (USB) port), or the like, or any combination thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ any of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, the network may include any communication technology by which information may travel between computing devices.

The network may, in some embodiments, include various wireless networks, which may be configured to couple various portable network devices, remote computers, wired networks, other wireless networks, or the like. Wireless networks may include any of a variety of sub-networks that may further overlay stand-alone ad-hoc networks, or the like, to provide an infrastructure-oriented connection for at least client computers 102-105 (or other mobile devices). Such sub-networks may include mesh networks, Wireless LAN (WLAN) networks, cellular networks, or the like. In at least one of the various embodiments, the system may include more than one wireless network.

The network may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), orthogonal frequency-division multiplexing (OFDM), ultra wide band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-time Transport Protocol (SIP/RTP), Short Message Service (SMS), Multimedia Messaging Service (MMS), or any of a variety of other communication protocols and/or technologies. In essence, the network may include communication technologies by which information may travel between client computers 102-105, messaging server computer 110, other computing devices not illustrated, other networks, or the like.

In various embodiments, at least a portion of the network may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self-organize based on current operating conditions and/or rule-based policies, such that the network topology of the network may be modified.

Illustrative Client Computer

Figure 2:
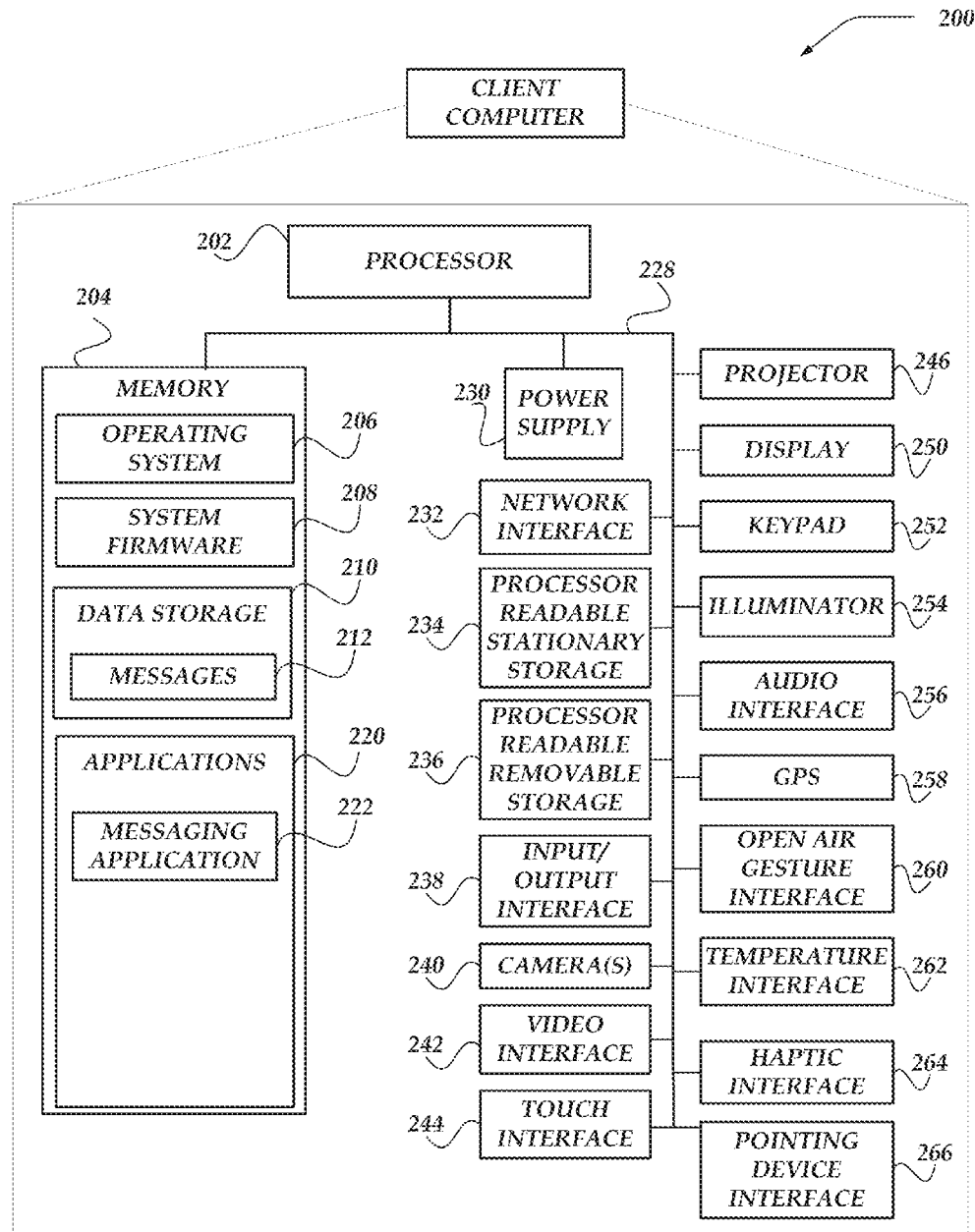
FIG. 2 shows an embodiment of a client computer that may be included in a system such as that shown in FIG. 1.

FIG. 2 shows one embodiment of client 200 that may include many more or less components than those shown. Client computer 200 may represent, for example, at least one embodiment of client computers 102-105 shown in FIG. 1. So, client computer 200 may be a mobile device (e.g., a smart phone or tablet), a stationary/desktop computer, or the like.

Client computer 200 may include processor 202 in communication with memory 204 via bus 228. Client computer 200 may also include power supply 230, network interface 232, processor-readable stationary storage device 234, processor-readable removable storage device 236, input/output interface 238, camera(s) 240, video interface 242, touch interface 244, projector 246, display 250, keypad 252, illuminator 254, audio interface 256, global positioning systems (GPS) receiver 258, open air gesture interface 260, temperature interface 262, haptic interface 264, pointing device interface 266, or the like. Client computer 200 may optionally communicate with a base station (not shown), or directly with another computer. And in one embodiment, although not shown, an accelerometer or gyroscope may be employed within client computer 200 for measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model, GSM, CDMA, TDMA, UDP, TCP/IP, SMS, MMS, GPRS, WAP, UWB, WiMax, SIP/RTP, GPRS, EDGE, WCDMA, LTE, UMTS, OFDM, CDMA2000, Ev-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light-emitting diode (LED), Organic LED (OLED), or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the mobile device is powered. Also, illuminator 254 may backlight these buttons in various patterns when particular actions are performed, such as dialing another mobile computer. Illuminator 254 may also cause light sources positioned within a transparent or translucent case of the mobile device to illuminate in response to actions.

Client computer 200 may also comprise input/output interface 238 for communicating with external peripheral devices or other computers such as other mobile computers and network computers. Input/output interface 238 may enable client computer 200 to communicate with one or more servers, such as messaging server computer 110 of FIG. 1. Other peripheral devices that client computer 200 may communicate with may include remote speakers and/or microphones, headphones, display screen glasses, or the like. Input/output interface 238 can utilize one or more technologies, such as Universal Serial Bus (USB), Infrared, Wi-Fi, WiMax, Bluetooth™, wired technologies, or the like.

Haptic interface 264 may be arranged to provide tactile feedback to a user of a client computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of mobile device 200 on the surface of the Earth. It is understood that under different conditions, GPS transceiver 258 can determine a physical location for mobile device 200. In at least one embodiment, however, client computer 200 may, through other components, provide other information that may be employed to determine a physical location of the mobile computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile computer with such peripheral human interface components is a wearable computer, which might include a remote pico projector along with one or more cameras that remotely communicate with a separately located mobile computer to sense a user's gestures toward portions of an image projected by the pico projector onto a reflected surface such as a wall or the user's hand.

A client computer may include a browser application that is configured to receive and to send web pages, web-based messages, graphics, text, multimedia, and the like. In various embodiments, the browser application may be configured to enable a user to communicate with other users, such as through a chat session on a web page. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules, or other data. Memory 204 may store system firmware 208 (e.g., BIOS) for controlling low-level operation of client computer 200. The memory may also store operating system 206 for controlling the operation of client computer 200. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the mobile device.

Data storage 210 may also store messages 212. Messages 212 may include messages sent to users of other client devices and/or messages received from users of other client devices.

Applications 220 may include computer executable instructions which, when executed by client computer 200, transmit, receive, and/or otherwise process instructions and data. Examples of application programs include, but are not limited to, calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.\

Applications 220 may also include messaging application 222. Messaging application 222 may be configured to manage a messaging session using any of a variety of messaging communications including, but not limited to email, SMS, IM, MMS, internet relay chat ("IRC"), Microsoft IRC ("mIRC"), Really Simple Syndication ("RSS") feeds, or the like. In some embodiments, messaging application 222 may be a client application that is configured to integrate and employ a variety of messaging protocols, including, but not limited to various push and/or pull mechanisms for client device 200. In one embodiment, messaging application 222 may interact with a browser for managing messages.

So, in some embodiments, client computer 200 may be enabled to employ various embodiments, combinations of embodiments, processes, or parts of processes, as described herein.

Illustrative Server Computer

Figure 3:
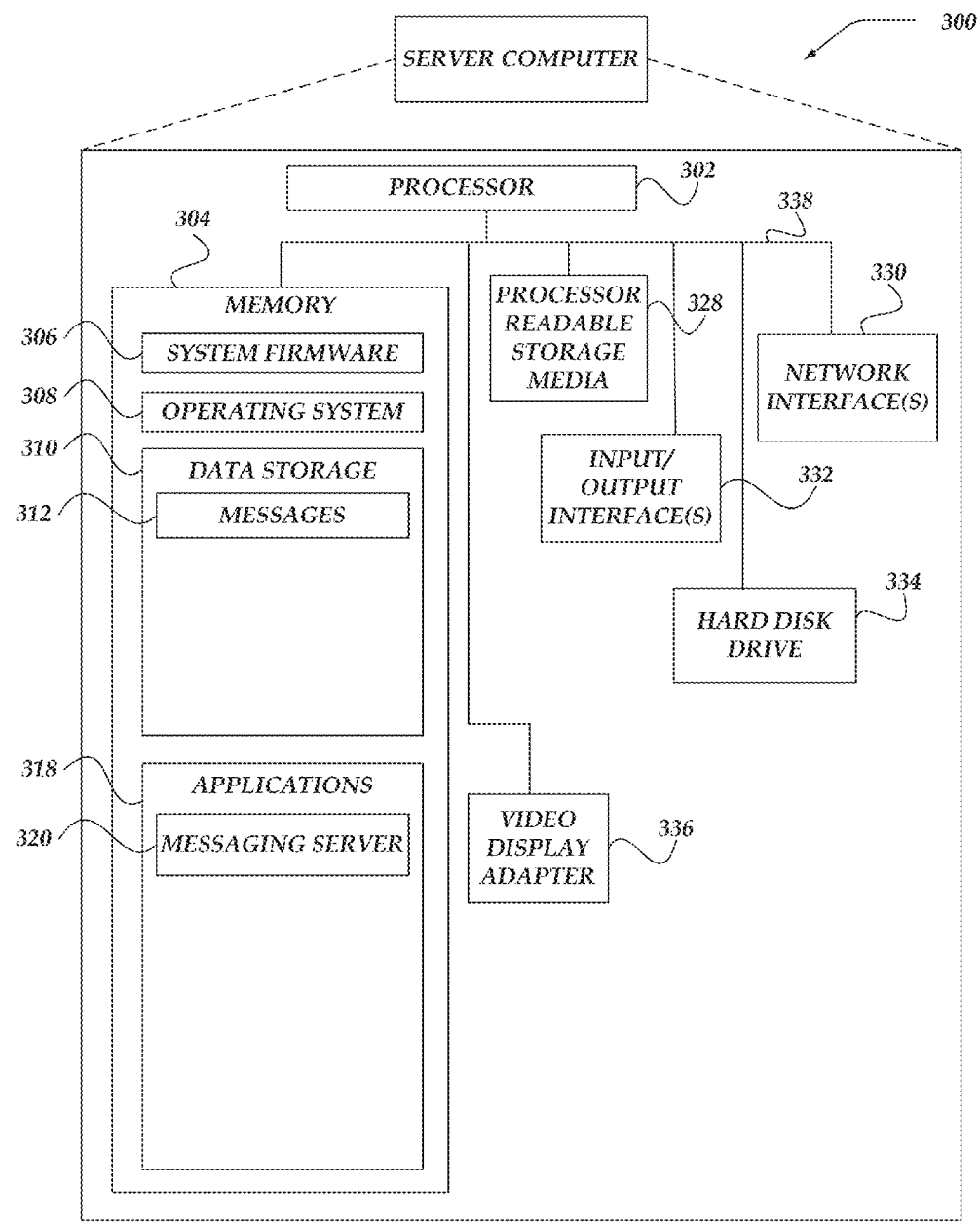
FIG. 3 shows an embodiment of a server computer that may be included in a system such as that shown in FIG. 1.

FIG. 3 shows one embodiment of a server computer 300, according to one embodiment of the invention. Server computer 300 may include many more or less components than those shown. The components shown, however, are sufficient to disclose an illustrative embodiment for practicing the invention. Server computer 300 may represent, for example messaging server computer 110 of FIG. 1.

Server computer 300 may include processor 302, processor readable storage media 328, network interface unit 330, an input/output interface 332, hard disk drive 334, video display adapter 336, and memory 304, all in communication with each other via bus 338. In some embodiments, processor 302 may include one or more central processing units.

As illustrated in FIG. 3, server computer 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Server computer 300 also comprises input/output interface 332 for communicating with external devices, such as a keyboard or other input or output devices not shown in FIG. 3. Input/output interface 332 can utilize one or more communication technologies, such as USB, infrared, Bluetooth™, or the like.

Memory 304 generally includes RAM, ROM, and/or one or more permanent mass storage devices, such as hard disk drive 334, tape drive, optical drive, and/or floppy disk drive. Memory 304 stores operating system 308 for controlling the operation of server computer 300. Any general-purpose operating system may be employed. System firmware 306 is also provided for controlling the low-level operation of server computer 300 (e.g., BIOS).

Although illustrated separately, memory 304 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 304 further includes one or more data storage 310, which can be utilized by server computer 300 to store, among other things, applications 318 and/or other data. For example, data storage 310 may also be employed to store information that describes various capabilities of server computer 300. The information may then be provided to another device based on any of a variety of events, including being sent as part of a header during a communication, sent upon request, or the like.

Data storage 310 may also include a database, text, spreadsheet, folder, file, or the like, that may be configured to maintain and store user account identifiers, user profiles, email addresses, IM addresses, and/or other network addresses; or the like. Data storage 310 may further include program code, data, algorithms, and the like, for use by a processor, such as processor 302 to execute and perform actions. In one embodiment, at least some of data store 310 might also be stored on another component of server computer 300, including, but not limited to processor-readable storage media 328, hard disk drive 334, or the like. Data storage 310 may include messages 312, which may be an embodiment of messages 212 of FIG. 2.

Applications 318 may include computer executable instructions, which may be loaded into mass memory and run on operating system 308. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth.

Applications 318 may include messaging server 320. Messaging server 320 may include virtually any computing component or components configured and arranged to forward messages from message user agents, and/or other message servers, or to deliver messages to a local message store, such as data storage 310, or the like. Thus, messaging server 320 may include a message transfer manager to communicate a message employing any of a variety of email protocols, including, but not limited, to Simple Mail Transfer Protocol ("SMTP"), Post Office Protocol ("POP"), Internet Message Access Protocol ("IMAP"), Network New Transfer Protocol ("NNTP"), or the like. Messaging server 320 may be configured to manage SMS messages, IM, MMS, IRC, RSS feeds, mIRC, or any of a variety of other message types. In one embodiment, message server 320 may enable users to initiate and/or otherwise conduct chat sessions, VOIP sessions, or the like.

So, in some embodiments, server computer 300 may be enabled to employ various embodiments, combinations of embodiments, processes, or parts of processes, as described herein.

General Operation

The operation of certain aspects of the invention will now be described with respect to FIGS. 4-8. In at least one of various embodiments, processes 400, 500, 600, 700, or 800 of FIGS. 4-8, respectively, may be implemented by and/or executed on a combination of computers, such as client computer 200 of FIG. 2 and/or server computer 300 of FIG. 3. Additionally, various embodiments described herein can be implemented in a system such as system 100 of FIG. 1. Although embodiments described herein may be executed on a client computer and/or a server computer, dialogues associated with SCM may be hidden from display on the client computer of a user.

Figure 4:
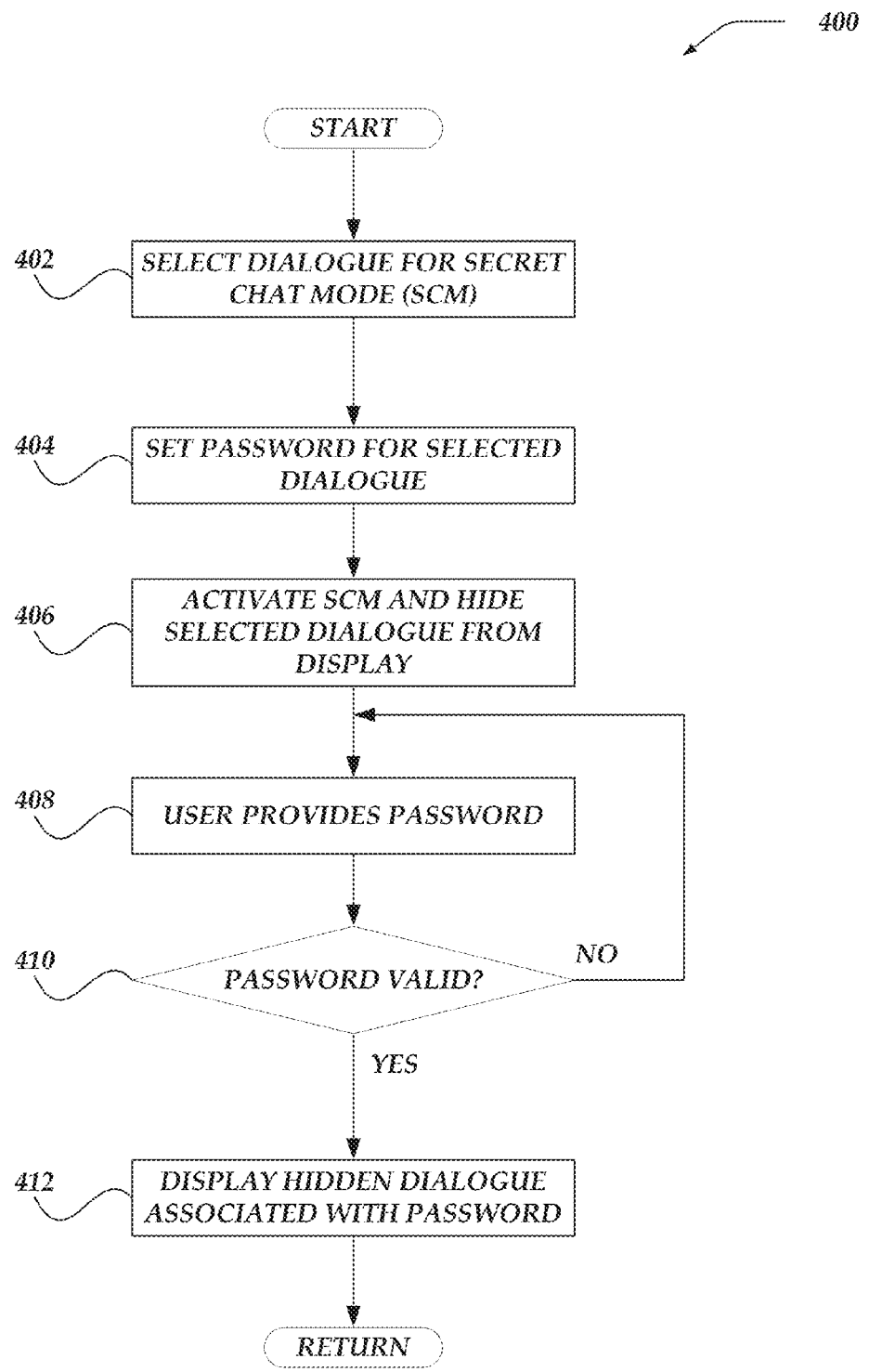
FIG. 4 illustrates a logical flow diagram generally showing one embodiment of an overview process for employing a secret chat mode in an instant messaging application.

FIG. 4 illustrates a logical flow diagram generally showing one embodiment of an overview process for employing secret chat mode in a messaging application. It should be noted that various embodiments described herein may be employed as part of a messaging application, an API to a messaging application, a plug-in for a browser or messaging application, or the like. Additionally, the messaging application may include other applications that have messaging features or functionality, such as, for example, a gaming application that includes a chat function.

Process 400 may begin, after a start block, at block 402, where one or more dialogues may be selected for secret chat mode (SCM). In some embodiments, a user of a client computer may select a dialogue for SCM through a variety of different mechanisms.

In various embodiments, the user may select SCM from a particular dialogue. In some embodiments, the user may select a SCM menu button from the particular dialogue. This action may open a window where the user can activate SCM and provide/set a password. In other embodiments, the user may provide/set the password directly through the text input box of the particular dialogue. In at least one such embodiment, the password may be distinguishable from other messages by use of a delimiter of more or more predetermined characters. For example, the user may type in "#*123abc", where the password is "123abc". It should be recognized that other delimiters and/or mechanisms may be employed to activate SCM from a particular dialogue. In yet other embodiments, other types of passwords or authentication mechanisms may be employed, such as, but not limited to, retinal scans, fingerprints, voice recognition, facial recognition, or the like.

By selecting SCM from a particular dialogue, that dialogue may deemed as being selected. An illustrative example of a user selecting a dialogue for SCM through the dialogue is show in FIGS. 9A-9E.

In various other embodiments, the user may be presented with a window where the user can individually select one or more dialogues for SCM. For example, the user may click on a main SCM menu button from a root window, window displaying list of dialogues, or the like. Clicking this button may open a window where each dialogue includes a corresponding check box. The user can select one or more of the dialogues for SCM by checking the corresponding check boxes. In some embodiments, the user may only be enabled to select dialogues that are not already in SCM. In this way, another observer is unaware that other hidden dialogues were previously put in SCM. An illustrative example of a user selecting a dialogue for SCM through a main SCM menu is show in FIGS. 10A-10C.

Process 400 may proceed to block 404, where a password may be set for the selected dialogue(s). As described herein, the user may select one or more dialogues to be in SCM. The user may be prompted to provide a set password for the selected dialogues. In some embodiments, the user may use a same password as previously used for other hidden dialogues. By using the same password, the selected dialogues may be grouped with the other hidden dialogues for the same password. In this way, if the user types in the password to view hidden dialogues (e.g., at block 408) all hidden dialogues associated with that password may be displayed. In other embodiments, the user may provide different passwords for different selected dialogues or groups of dialogues.

Process 400 may continue at block 406, where SCM may be initiated or otherwise activated for the selected dialogue. By activating SCM, the selected dialogue may be hidden from display on the client computer. In some embodiments, hiding a dialogue from display may include removing the dialogue from a list of previous dialogues (or history of dialogues). In various embodiments, the hidden dialogues and messages associated with the hidden dialogues may be preserved and maintained so that if the user unlocks or deactivates SCM, then those dialogues and messages can be re-displayed to the user on the client computer.

In at least one of various embodiments, hidden dialogues (and associated messages) may be stored on the client computer (e.g., the smart phone) and not deleted when SCM is activated. In other embodiments, hidden dialogues (and associated messages) may be deleted from the client computer when SCM is activated. In such an embodiment, a server computer may store the hidden dialogues, so that when a user unlocks or deactivates SCM, the client computer may send a request to the server computer to retrieve the hidden dialogues for display at the client computer. Although retrieving or downloading hidden dialogues from a server computer may consume network bandwidth and processing resources, storing the dialogues on the server computer and removing them from the client computer may reduce the ability to circumvent the messaging application and obtain the hidden dialogues from the memory of the client computer.

In at least one of various embodiments, each contact associated with the hidden dialogue may also be hidden. An embodiment of selecting contacts for SCM is described in more detail below in conjunction with FIG. 5. Briefly, in some embodiments, the at least one contact associated with a hidden dialogue may be removed from a contact list. If the contact is also associated with a non-hidden dialogue, then the contact may not be hidden or removed from the contact list.

Figure 11B:
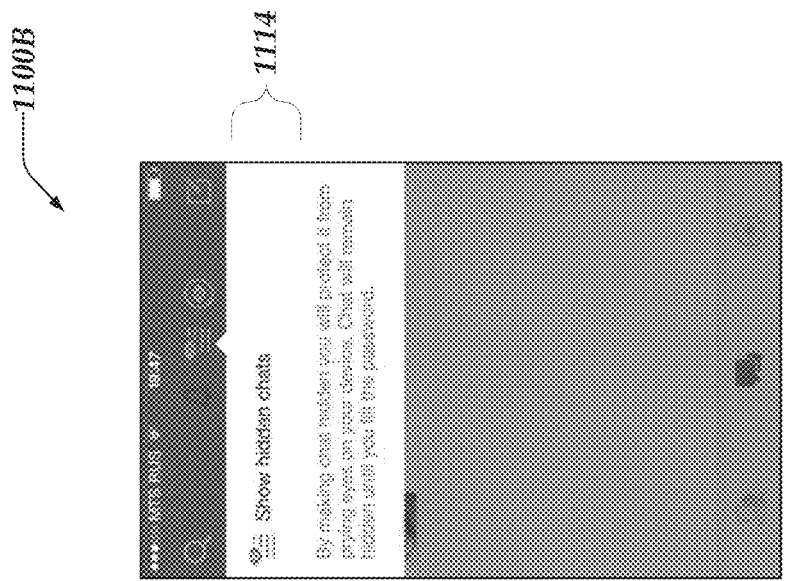
Figure 11A:
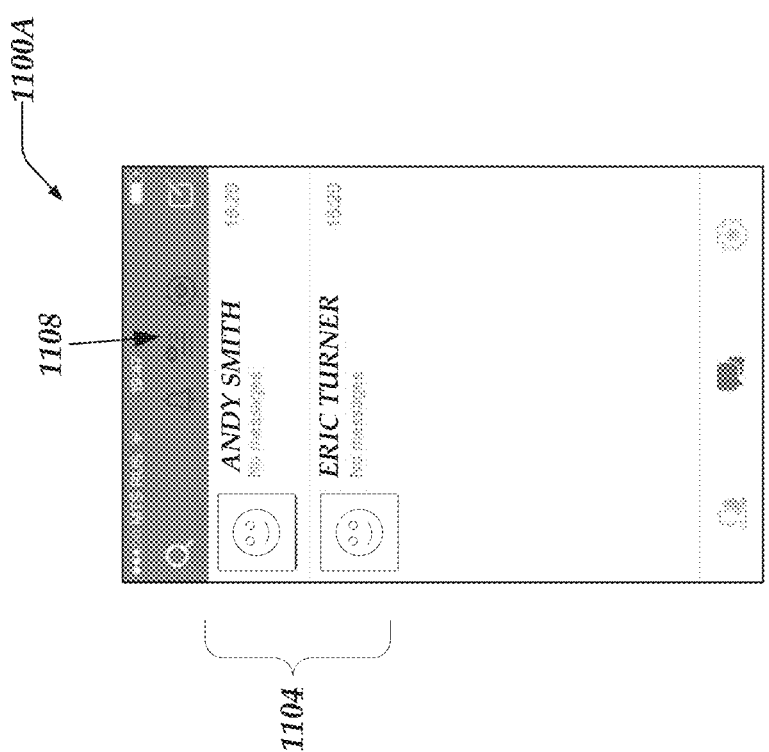

In any event, process 400 may proceed next to block 408, where a user may provide a password to unlock and/or deactivate SCM for one or more dialogues. In various embodiments, the user may provide this password through a SCM menu, such as illustrated in FIGS. 11A-11C. In other embodiments, the user may provide the password through any of the non-hidden dialogues. For example, assume a dialogue with John is hidden. The user may open a dialogue window for Matt. From this dialogue window (e.g., a text input box) the user may provide a password to deactivate SCM for the dialogue with John. In this way, a user can quickly access hidden dialogues without having to navigate multiple windows and/or menus.

Process 400 may continue next at decision block 410, where a determination may be made whether the provided password is valid. In at least one of various embodiments, the provided password may be compared with one or more set passwords to determine if the provided password is valid. If the provided password matches a set password, then the provided password is valid. An embodiment of notifying a user of the password-validation determination is described in more detail below in conjunction with FIG. 7. If the password is valid, then process 400 may flow to block 412; otherwise process 400 may loop to block 408 and continue to hide from display dialogues associated with SCM.

At block 412, the hidden dialogue associated with the password may be displayed. As described herein, one or more hidden dialogues may be associated with a password. In various embodiments, each of these dialogues may be displayed to a user, such as in the list of dialogues. In at least one of various embodiments, if a user provides the password (e.g., through a non-hidden dialogue) for a single hidden dialogue, then an interactive window for the hidden dialogue may be displayed. As noted above, automatically opening a hidden dialogue may reduce the number of windows or menus the user may have to traverse to interact with the hidden dialogue.

In at least one of various embodiments, each hidden contact associated with the hidden dialogue may also be unhidden and either displayed on the client computer and/or added to the contact list.

Figure 8:
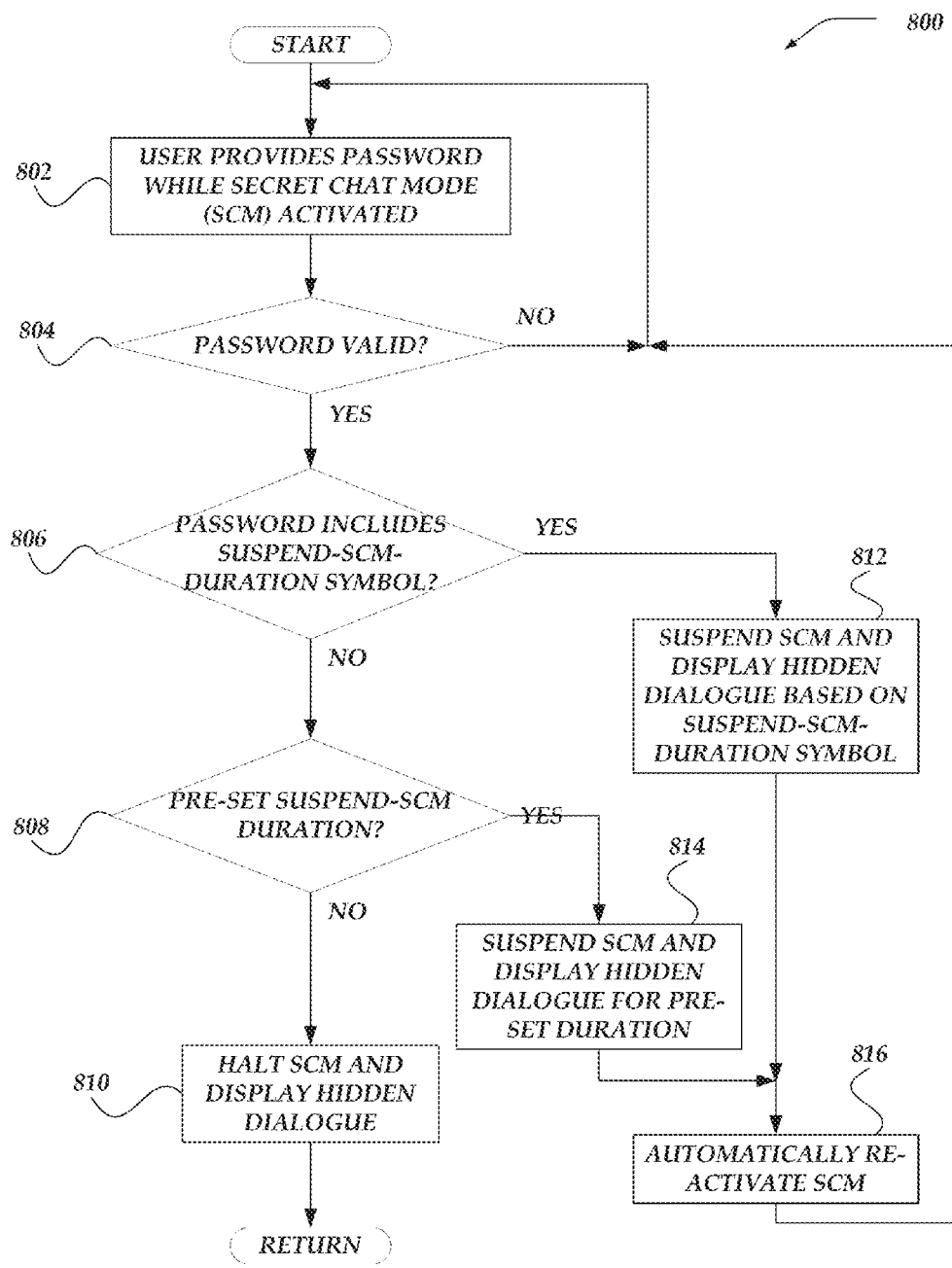
FIG. 8 illustrates a logical flow diagram generally showing one embodiment of a process for at least temporarily suspending secret chat mode for at least one dialogue.

In various embodiments, SCM may be re-activated for the hidden dialogue based on a variety of different user actions, user profile settings/parameters, or the like. FIG. 8 illustrates an embodiment of re-activating SCM for a dialogue based on a suspend-SCM time duration. In other embodiments, SCM may be reactivated based on a user action. For example, in some embodiments, the user may provide a new set password to reactivate SCM for that dialogue (similar to what is described above in conjunction with blocks 404 and 406). In other embodiments, SCM may be reactivated based on a geo-location of the network computer, Wi-Fi network availability or disconnection, other nearby devices (e.g., a location of a person's mobile phone, where that person is one from whom the user is trying to hide the dialogue), change of position or orientation of the client computer (e.g., turning the screen towards the ground, rotating from vertical to horizontal, shaking the client computer, or the like), or the like. In yet other embodiments, SCM may be automatically reactivated if the user closes out of a dialogue that is associated with SCM or if the user closes or collapses the messaging application. It should be recognized that these and other user actions may be employed to automatically reactivate SCM for one or more dialogues (or contacts) that were temporarily unlocked/unhidden and displayed on the client computer.

After block 412, process 400 may terminate and/or return to a calling process.

Figure 5:
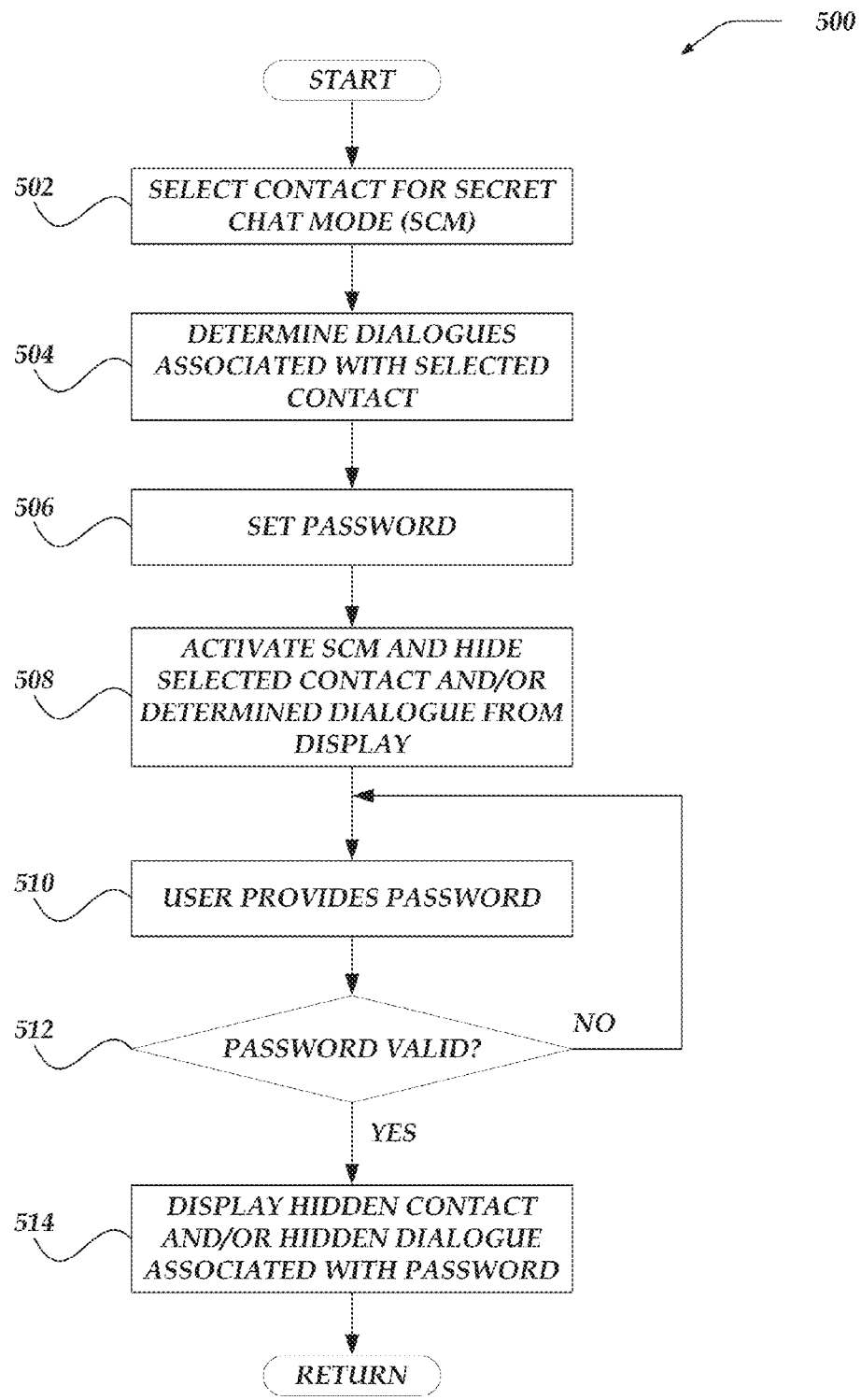
FIG. 5 illustrates a logical flow diagram generally showing an alternative embodiment of a process for employing a secret chat mode in an instant messaging application.

FIG. 5 illustrates a logical flow diagram generally showing an alternative embodiment of a process for employing a secret chat mode in an instant messaging application. Process 500 may begin, after a start block, at block 502, where a contact may be selected for SCM. In some embodiments, a user may select one or more contacts from a contact list, such as by clicking check boxes associated with a corresponding contact. In other embodiments, a user can select a contact by selecting a particular dialogue, similar to that which is described above in conjunction with FIG. 4.

In any event, process 500 may proceed to block 504, where one or more dialogues associated with the selected contact may be determined. In at least one of various embodiments, each dialogue in a list of dialogues that includes the selected contact as a participant in that dialogue may be selected. In some embodiment, a contact may be selected at block 502 where there are no current dialogues. In at least one such embodiment, if a contact is in SCM, future dialogues between the user and the contact may be automatically associated with the SCM. In this way a user can activate SCM for a contact before a first message is ever received from the contact. But when a message is received from the contact, it may be protected by secret chat mode (e.g., a replacement notification may be provided to the user).

Process 500 may continue at block 506, where a password may be set for the selected contact and/or the determined dialogues. In at least one of various embodiments, block 506 may employ embodiments of block 404 of FIG. 4 to set the password.

Process 500 may proceed next to block 508, where SCM may be activated for the selected contact. In at least one of various embodiments, the selected contact and/or the dialogues associated with the contact may be hidden and removed from display on the client computer. In at least one of various embodiments, block 508 may employ embodiments of block 406 of FIG. 4 to hide dialogues and/or contacts from display on the client computer.

Process 500 may continue next at block 510, where a user may provide a password. In at least one of various embodiments, block 510 may employ embodiments of block 408 of FIG. 4 to determine a user provided password.

Process 500 may proceed to decision block 512, where a determination may be made whether the provided password is valid. In at least one of various embodiments, decision block 512 may employ embodiments of decision block 410 of FIG. 4 to determine if the provided password is valid. If the password is valid, then process 500 may flow to block 514; otherwise process 500 may loop to block 510.

At block 514, SCM may be suspended for the hidden contacts associated with the provided password, and those contacts may be displayed on the client computer. In at least one of various embodiments, the contacts may be displayed in a contact list. Similarly, dialogues associated with the contacts may be unhidden and displayed to the user. In various embodiments, block 514 may employ embodiments of block 412 of FIG. 4 to unhide and display contacts and/or dialogues to the user.

After block 514, process 500 may terminate and/or return to a calling process to perform other actions.

Figure 6:
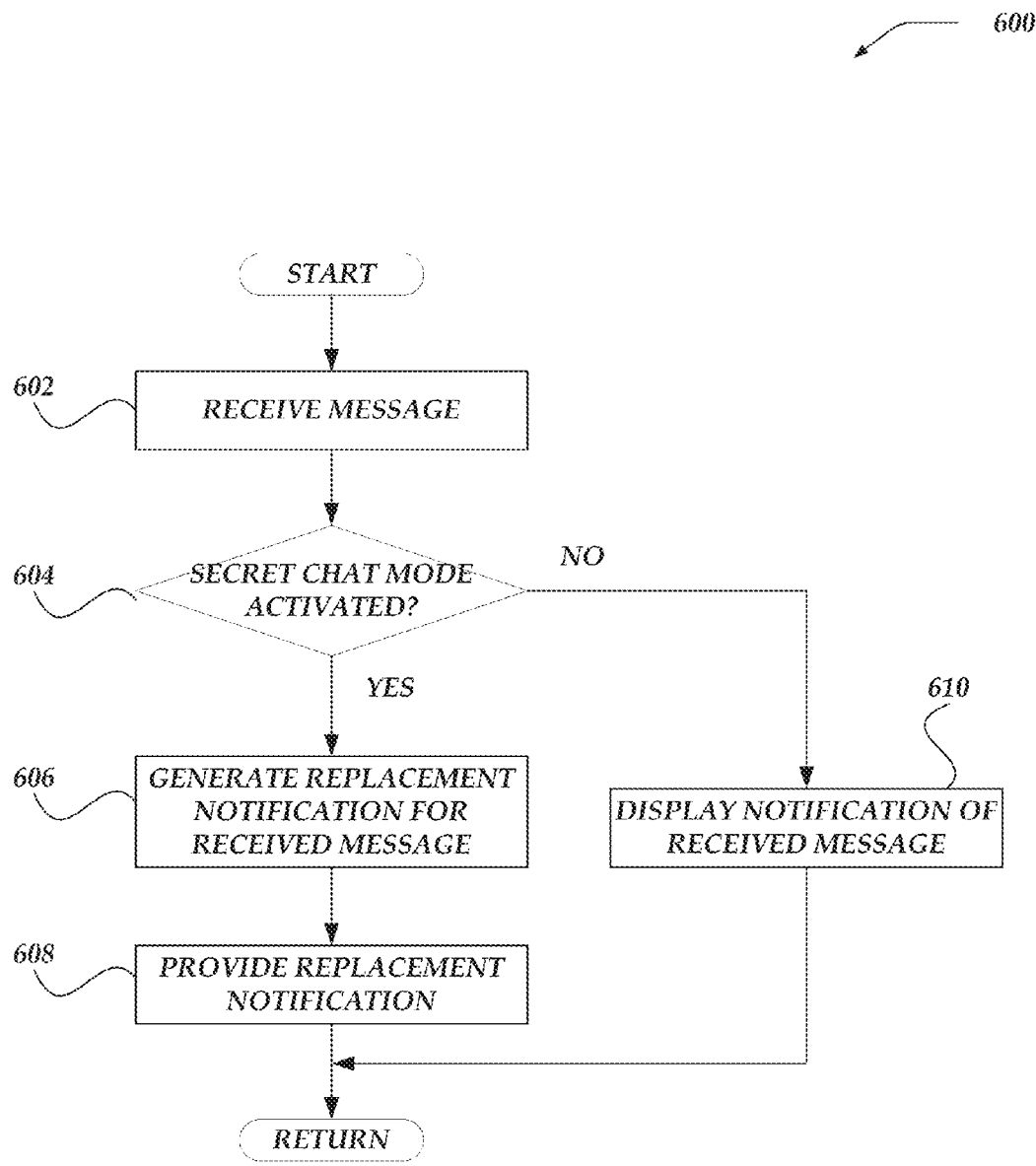
FIG. 6 illustrates a logical flow diagram generally showing one embodiment of a process for providing replacement notifications for messages associated with a dialogue in secret chat mode.

FIG. 6 illustrates a logical flow diagram generally showing one embodiment of a process for providing replacement notifications for messages associated with a dialogue in secret chat mode. Process 600 may begin, after a start block, at block 602, where a message may be received. In various embodiments, this message may be associated with at least one dialogue, either hidden dialogues or non-hidden dialogues Process 600 may proceed to decision block 604, where a determination may be made whether SCM is activated for the dialogue associated with the received message. In some embodiments, a dialogue associated with the received message may be determined. In at least one embodiment, this determination may be based on the sender and/or recipients of the message. The determined dialogue may be compared to a list of hidden or dialogues in SCM to determine if SCM is activated for the dialogue associated with the received message. If SCM is activated, then process 600 may flow to block 606; otherwise, process 600 may flow to block 610.

At block 610, a notification of the received message may be displayed on the client computer for the non-hidden dialogue. This notification may include information from the received message. Examples of such information may include an identifier of the sender (e.g., a phone number, email address, contact name, or the like), at least a portion of the message body, time of arrival, or the like.

Similar to that which is described herein, SCM may be reactivated for the contacts and/or associated dialogues after a predetermined time, after a time duration provided by a user, based on a user action (e.g., turning the client computer upside down, closing the messaging application, exiting the dialogue, or the like), or the like.

After block 610, process 600 may terminate and/or return to a calling process to perform other actions.

If, at decision block 604, the received message is associated with an active SCM, then process 600 may flow from decision block 604 to block 606. At block 606, a replacement notification may be generated for the received message. As described herein, the replacement notification may be virtually any notification other than the notification of the message. In some embodiments, the replacement notification may modify a real notification of the message. For example, the sender's identifier may be modified, the text of the message may be changed, or the like.

In other embodiments, the replacement notification may be a completely different notification that is unrelated to the message (or its information) or a typical message notification. For example, a low battery notification may be generated as the replacement notification.

In various embodiments, the replacement notification may include a symbol, text, variations in text characteristics (e.g., color, font, size, or the like), additional client computer vibrations or sound, or the like. These additional features may be utilized to inform the user that the provided notification is in fact a replacement notification rather than a true notification. For example, a replacement notification that is a low battery notification may be in red text, compared to a typical low battery notification in white text.

In any event, process 600 may proceed to block 608, where the replacement notification may be provided on the client computer. As described herein, the replacement notification may be visual, audible, tactile, or the like, or any combination thereof. So various graphical, audio, and/or tactile (e.g., haptic) interfaces may be employed to provide the replacement notification to the user.

After block 608, process 600 may terminate and/or return to a calling process to perform other actions.

Figure 7:
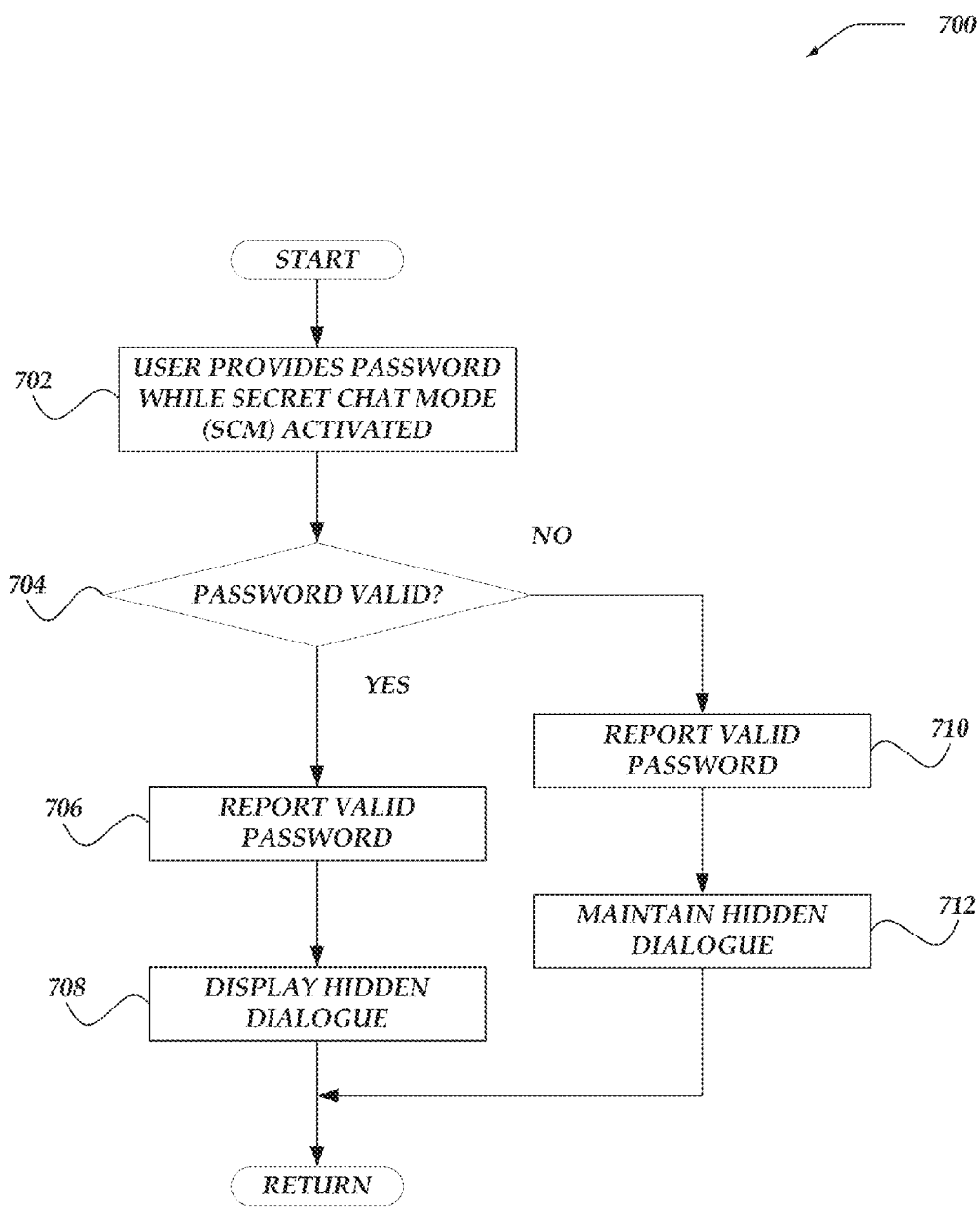
FIG. 7 illustrates a logical flow diagram generally showing one embodiment of a process for providing an indication of password validity regarding secret chat mode.

FIG. 7 illustrates a logical flow diagram generally showing one embodiment of a process for providing an indication of password validity regarding secret chat mode. Process 700 may begin, after a start block, at block 702, where a password may be provided by a user while SCM is activated for at least one dialogue. In various embodiments, block 702 may be an embodiment of block 408 of FIG. 4.

Process 700 may proceed to decision block 704, where a determination may be made whether received password is valid. In various embodiments, decision block 704 may employ embodiments of decision block 410 of FIG. 4 to determine if the user provided password is valid. If the password is valid, then process 700 may flow to block 706; otherwise, process 700 may flow to block 710.

At block 706, the valid password may be reported and/or otherwise provided to the user. In various embodiments, a notification or alert may be displayed on the client computer to the user. This notification may be a text box or pop-up window that indicates the provided password is valid. One non-limiting, non-exhaustive example of such a notification may be a text box that states "password accepted," such as illustrated in FIG. 11D. In other embodiments, the notification may be one or a series of sounds and/or vibrations, which the user or an observer of the client computer can understand as a notification that the password is valid.

Process 700 may then proceed to block 708, where the hidden dialogue associated with the provided password may be displayed. In at least one of various embodiments, block 708 may employ embodiments of block 412 to display hidden dialogue on the client computer to the user.

After block 708, process 700 may terminate and/or return to a calling process to perform other actions.

If, at decision block 704, the provided password is invalid, then process 700 may flow from decision block 704 to block 710. At block 710, a valid password may be reported and/or otherwise provided to the user. In various embodiments, block 710 may employ embodiments of block 706 to report a valid password. One non-limiting, non-exhaustive example of such an alert may be a text box that states "password accepted," such as illustrated in FIG. 11E. By providing a valid password alert regardless of whether the password is valid or invalid, the status of any hidden dialogue may be concealed from an observer of the client computer.

Process 700 may proceed next to block 712, where the hidden dialogue may be maintained and not displayed. In various embodiments, other than the valid password being reported, the display and/or dialogue list may be unmodified and the hidden status of dialogues in SCM may be maintained.

After block 712, process 700 may terminate and/or return to a calling process to perform other actions.

FIG. 8 illustrates a logical flow diagram generally showing one embodiment of a process for at least temporarily suspending secret chat mode for at least one dialogue. Process 800 may begin, after a start block, at block 802, where a password may be provided by a user while SCM is activated for at least one dialogue. In various embodiments, block 802 may be an embodiment of block 408 of FIG. 4 and/or block 702 of FIG. 7.

Process 800 may proceed to decision block 802, where a determination may be made whether the password is valid. In at least one of various embodiments, decision block 802 may employ embodiments of decision block 410 of FIG. 4 and/or decision block 704 of FIG. 7 to determine if the password is valid. If the password is valid, then process 800 may flow to decision block 806; otherwise, process 800 may loop to block 802 and maintain dialogues in SCM hidden from display.

At decision block 806, a determination may be made whether the password includes a suspend-SCM-duration symbol. A suspend-SCM-duration symbol may indicate how long to suspend SCM and display hidden dialogue before automatically re-activating SCM and re-hiding the dialogue. In various embodiments, the suspend-SCM-duration symbol may be one or more characters preceding or following the password. For example, the provided password may be "123abc 5". In this example, the "5" may be the suspend-SCM-duration symbol because it is separated from the rest of the password by a space and it may indicate that SCM of the dialogues associated with the password "123abc" should be suspended for five seconds.

In another embodiments, the provided password may be "123ABC^". In this example, a lookup table may be employed to determine a time duration that corresponds to the "^" symbol. In one non-limiting, non-exhaustive example, the "^" may correspond to a SCM suspend time duration of 60 seconds. In various embodiments, different symbols and/or characters may indicate different time durations. Continuing the example above, a "&" may correspond to a SCM suspend time duration of 90 seconds, a "*" may correspond to a SCM suspend time duration of two minutes, and so on.

In other embodiments, the suspend-SCM-duration symbol may be offset by one or more characters. For example, the provided password may be "123abc^&45". In this example, "^&45" may be the suspend-SCM-duration symbol, where "^&" may indicate that the following number is the suspend time duration, e.g., 45 seconds.

In various embodiments, the provided password may be parsed to determine if a suspend-SCM-duration symbol is included along with the password. The parsing may be based on spaces or other characters utilized to delineate the suspend-SCM duration and/or suspend-SCM-duration symbol from the password itself.

If the password includes a suspend-SCM-duration symbol, then process 806 may flow to block 812; otherwise, process 800 may flow to decision block 808.

At block 812, SCM may be suspended and at least one hidden dialogue associated with the provided password may be displayed based on the suspend-SCM-duration symbol. In various embodiments, block 812 may employ embodiments of block 412 of FIG. 4 to display the hidden dialogue, but for the time duration associated with the provided suspend-SCM-duration symbol. After which time, SCM may be re-activated at block 816.

If, at decision block 806, the password does not include a suspend-SCM-duration symbol, then process 800 may flow from decision block 806 to decision block 808. At decision block 808, a determination may be made whether a suspend-SCM duration was pre-set. In various embodiments, a user may be enabled to pre-set a suspend-SCM duration. In at least one of various embodiments, an SCM menu may include a list of possible time durations or an input text box for manually providing time durations. If a suspend-SCM duration is pre-set, then process 800 may flow to block 814; otherwise, process 800 may flow to block 810.

At block 814, SCM may be suspended and at least one hidden dialogue associated with the provided password may be displayed for the pre-set duration. In various embodiments, block 814 may employ embodiments of block 412 of FIG. 4 to display the hidden dialogue, but for the pre-set time duration. After which time, SCM may be re-activated at block 816.

At block 816, SCM may be automatically re-activated after the suspend-SCM duration has lapsed. In at least one of various embodiments, block 816 may employ embodiments of block 406 to activate SCM for the temporarily displayed dialogues (noting that the temporarily displayed dialogues may be the selected dialogues for activating SCM). After block 816, process 800 may loop to block 802 to wait for a user to provide a password to at least temporarily deactivate SCM.

If, at decision block 808, there is no pre-set suspend-SCM duration, then process 800 may flow from decision block 808 to block 810. At block 810, SCM may be halted and at least one hidden dialogue associated with the provided password may be displayed. In various embodiments, these displayed dialogues may be deemed to be non-hidden such that the user may have to provide a new set password to reactivate SCM for the displayed dialogues in accordance with embodiments described herein. After block 810, process 800 may terminate and/or return to a calling process to perform other actions.

It should be understood that the embodiments described in the various flowcharts may be executed in parallel, in series, or a combination thereof, unless the context clearly dictates otherwise. Accordingly, one or more blocks or combinations of blocks in the various flowcharts may be performed concurrently with other blocks or combinations of blocks. Additionally, one or more blocks or combinations of blocks may be performed in a sequence that varies from the sequence illustrated in the flowcharts.

Further, the embodiments described herein and shown in the various flowcharts may be implemented as entirely hardware embodiments (e.g., special-purpose hardware), entirely software embodiments (e.g., processor-readable instructions), or a combination thereof. In some embodiments, software embodiments can include multiple processes or threads, launched statically or dynamically as needed, or the like.

The embodiments described herein and shown in the various flowcharts may be implemented by computer instructions (or processor-readable instructions). These computer instructions may be provided to one or more processors to produce a machine, such that execution of the instructions on the processor causes a series of operational steps to be performed to create a means for implementing the embodiments described herein and/or shown in the flowcharts. In some embodiments, these computer instructions may be stored on machine-readable storage media, such as processor-readable non-transitory storage media.

Use Case Illustrations

FIGS. 9A-9E show use case screenshot examples of embodiments for establishing a secret chat mode (SCM) for a selected dialogue. Window 900A may include a list of dialogues (dialogue list 904) that the user has participated in with one or more contacts. Window 900A may also include SCM menu buttons 908 and 910. SCM menu button 908 may open a menu for unlocking SCM for one or more dialogues (as illustrated in FIGS. 11A-11E). And SCM menu button 910 may open a menu for activating SCM for one or more dialogues (as illustrated in FIGS. 10A-10C). In any event, FIGS. 9A-9E may illustrate embodiments for a user to activate SCM through messaging window of a particular dialogue. In this example, a user may select a dialogue, such as dialogue 906. Selecting such a dialogue may open an instant messaging window.

Window 900B of FIG. 9B illustrates an example of an instant messaging window where a user can input text for a text message or other instant messaging format/protocol. In this example, the contact is Alexey Lang. If the user would like to hide messages to and/or from Alexey, then the user may enable SCM for the select the dialogue. In some embodiments, a user may click on button 914 to open a SCM menu for this particular dialogue.

Window 900C of FIG. 9C illustrates an example of a SCM menu for enabling SCM for the dialogue with Alexey (i.e., the selected dialogue). In window 900C a user can enable secret chat mode for the selected dialogue by activating slider 924. It should be recognized that other graphical control elements of the GUI may be employed to enable a user to active secret chat mode. Activation of slider 924 may prompt the user to input a password for the SCM.

Figure 9E:
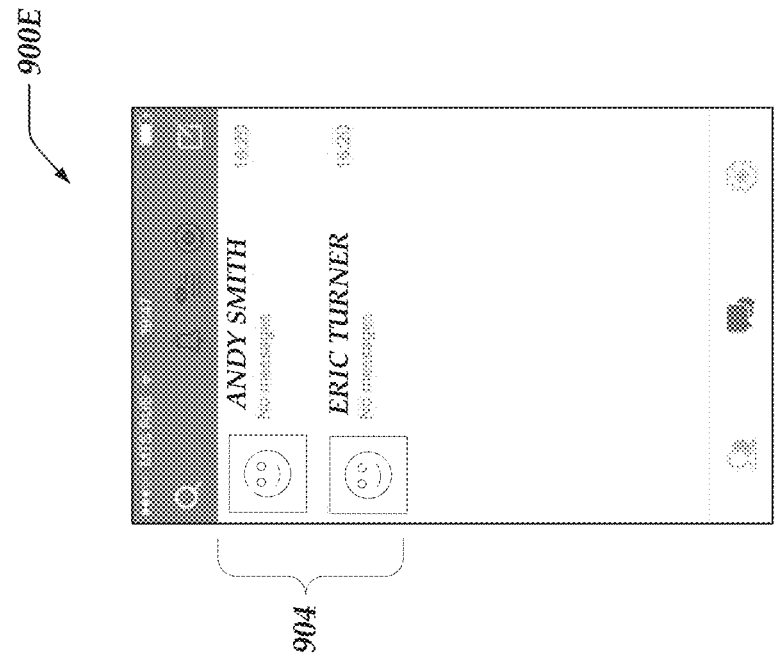
Figure 9D:
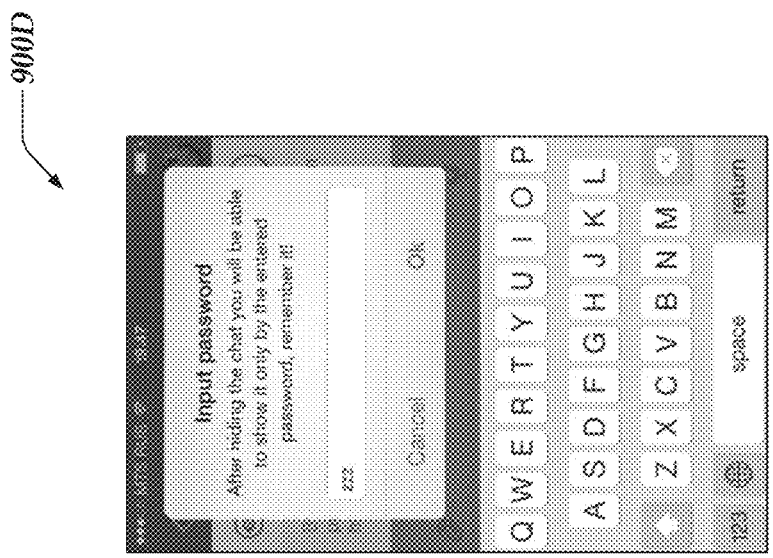

Window 900D of FIG. 9D illustrates an example of a window where a user can input a password to enable SCM for the dialogue associated with Alexey. As described herein, a user may provide different or separate passwords for one or more selected dialogues. So, for example, a user may provide a first password for dialogue associated with Alexey and a second password for dialogue associated with Andrey Nalitkin. In some embodiments, if the user provides the same text for the first password and the second password, then the two dialogues may be linked such that a single entry of the password may unlock both dialogues. After a user enters a password and presses "ok" then the selected dialogue may be hidden from display.

Window 900E of FIG. 9E may be an embodiment of window 900A of FIG. 9A, but with the newly enable SCM hiding the dialogue with Alexey Lang. So, dialogue list 904 no longer includes the dialogue with Alexey, until a time when the SCM is unlocked.

In some embodiments, a user may enable and provide a SCM password directly from the text input box in the messaging window, without the use of a SCM menu. For example, in window 900B of FIG. 9, the user may type in a password in text input box 916. In at least one of various embodiments, the password may be identifiable or distinguishable from an instant message based on a delimiter of more or more predetermined characters. For example, the user may input "*#abc123" into text input box 916 to set a password of "abc123." If the user provides a password in this fashion, window 900E of FIG. 9E may open (without opening windows 900C or 900D of FIGS. 9C and 9D, respectively) showing dialogue list 904 without the newly hidden dialogue with Alexey.

FIGS. 9A-9E illustrate an embodiment where a user can activate SCM from the messaging window of a particular dialogue or contact. However, embodiments are not so limited, and other mechanisms for selecting dialogues for SCM may be employed. For example, FIGS. 10A-10C show use case screenshot examples of alternative embodiments for establishing a secret chat mode for a selected dialogue.

Window 1000A of FIG. 10A may be an embodiment of window 900A of FIG. 9A showing dialogue list 1004. A user may select SCM menu button 1010 to open a menu for allowing a user to activate a SCM.

Window 1000B of FIG. 10B illustrates an embodiment of a SCM menu. A user may be enabled to select which dialogues to put into SCM. In this illustration, a user may selected one or more of check boxes 1012. After a selection, the user can click button 1014 to activate SCM for the selected dialogues.

Window 1000C of FIG. 10C may be an embodiment of window 1000A of FIG. 10A, but with the newly enable SCM hiding the dialogue with Alexey Lang. So, dialogue list 1004 no longer includes the dialogue with Alexey, until a time when the SCM is unlocked.

FIGS. 11A-11E show use case screenshot examples of embodiments for unlocking a secret chat mode for at least one dialogue. Window 1100A of FIG. 11A may be an embodiment of window 900F of FIG. 9E, where dialogue from Alexey Lang is hidden in dialogue list 1104. However, to a person who accesses the phone, apart from the user who enabled the secret chat mode, may have no indication that this dialogue is hidden from view. A user may unlock secret chat mode for one or more dialogues through a master secret chat mode menu, which may be accessed by pressing button 1108, By pressing button 1108, window 1100B of FIG. 11B may be opened. A user may click on the show hidden chats button 1114 to access hidden dialogues, i.e., dialogues protected by secret chat mode. Pressing show hidden chats button 1114 may open window 1100C of FIG. 11C where a user can input a password. As described herein, separate dialogues may be protected by different or separate passwords. So if a user types in a first password, then dialogue associated with that secret chat mode password may be displayed, while still hiding other dialogues associated with other passwords. As mentioned above, if multiple dialogues are associated with a single or same password, then secret chat mode for each of these dialogues may be unlocked and the dialogues displayed, while still hiding and other dialogues associated with other passwords. Assuming the user enters a correct or valid password, then a password accepted indication may be provided, such as shown in FIG. 11D. If a user types in a valid password into window 1100C of FIG. 11C and presses "ok," then window 1100D of FIG. 11D may open. Window 1100D may be an embodiment of window 1100A of FIG. 11A. As illustrated, dialogue list 1104 in window 1100D now includes the previously hidden dialogue with Alexey Lang. Additionally, window 1100D may include password accepted indicator 1120. However, if an invalid password is provided in window 1100C of FIG. 11C, then window 1100E of FIG. 11E may open. Window 1100E may be an embodiment of window 1100A of FIG. 11A. As illustrated, dialogue list 1104 in window 1100E does not include the dialogue with Alexey Lang because an invalid password was provided and the dialogue is still hidden. However, password accepted indicator 1120 may still be displayed. In this way, a person typing in a password has no idea if the password was valid or not, or if there is even any hidden dialogues to be unlocked.

FIGS. 12A-12C show use case screenshot examples of embodiments for providing replacement notifications for messages associated with a dialogue in secret chat mode. Example 1200A of FIG. 12A may illustrate a smart phone screen when a message associated with a dialogue in secret chat mode is received. Instead of displaying a notification of the actual received message, replacement notification 1202 may be a predetermined notification from another contact or a non-existent contact. In this example, the replacement notification may be from "Mom" with a particular message. In some embodiments, this replacement notification may be distinguishable, to the user, from an actual message from "mom" by a variety of different visual indicators, such as a specific message, additional characters (e.g., a hyphen before and after the message text), a variation of the text color, a different display of the time received (e.g., "2 mins ago" v. "2 m ago"), additional displayed symbols, or the like. In at least one of various embodiments, the user may be enabled to select who the replacement notification is from, the text of the message, and/or any additional visual indicators to include when the replacement notification is displayed.

As described herein, the replacement notification may be other system notifications, push-notifications from other applications, or the like. For example, replacement notification 1204 in example 1200B of FIG. 12B include a statement that the Wi-Fi is disconnected. This replacement notification may be a fictional notification that is generated by the IM application in response to receiving a message associated with at dialogue in secret chat mode.

Similarly, replacement notification 1206 in example 1200C of FIG. 12C may be a system notification, such as "battery low." As discussed above, the notification may include other visual indicators to suggest to the user that the "battery low" notification is a replacement notification rather than an actual notification that the battery is almost out of power. In this example illustration symbol 1208 may be used to indicate the replacement notification. Again, in various embodiments, the user may be enabled to define and/or otherwise modify the replacement notification or any visual indicators that are provided with the replacement notification.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A method for improving a client computer's management of messaging for a user, wherein the client computer performs actions, comprising:
   determining at least one contact of the user and at least one dialogue between the user and the at least one contact that are selected by the user;
   determining at least one password for the at least one dialogue that is set by the user;
   when the at least one password for the at least one dialogue is received from the user, activating a secret chat mode (SCM) for the at least one dialogue, wherein at least one of the at least one dialogue or the at least one contact is selectively hidden from display on the client computer;
   when the at least one password is received from the user during SCM for the at least one dialogue, deactivating the SCM for the at least one dialogue, wherein the deactivation of the SCM causes the at least one dialogue to be unhidden and displayed on the client computer; and
   when the received at least one password is determined to include a symbol that indicates a time duration for unhiding and displaying the at least one dialogue, automatically re-hiding the at least one dialogue after expiration of the time duration.

2. The method of claim 1, wherein the at least one dialogue is selected by opening at least one of an existing dialogue or a new dialogue between the user and the at least one contact of the user.

3. The method of claim 1, further comprising:
   providing a list of previous dialogues to the user; and
   receiving the user's selection of at least one of the previous dialogues in the list.

4. The method of claim 1, further comprising, automatically re-activating the SCM for the at least one dialogue and re-hiding the at least one dialogue after expiration of a pre-set time duration.

5. The method of claim 1, further comprising, displaying a notification that received password is valid regardless of whether the received password is valid or invalid.

6. The method of claim 1, further comprising:
   receiving a message associated with the at least one dialogue in SCM;

generating a replacement notification for the message based on information that is different than information included both in the message and a notification for the message; and providing the replacement notification to the user instead of the notification.

7. The method of claim 1, further comprising, hiding display of the at least one contact in a contact list during SCM.

8. A system for improving messaging for a user of a client computer, comprising:
    a server computer that manages messages exchanged between the client computer and other client computers;
    the client computer that performs actions, comprising:
        determining at least one contact of the user and at least one dialogue between the user and the at least one contact that are selected by the user;
        determining at least one password for the at least one dialogue that is set by the user;
        when the at least one password for the at least one dialogue is received from the user, activating a secret chat mode (SCM) for the at least one dialogue, wherein at least one of the at least one dialogue or the at least one contact is selectively hidden from display on the client computer;
        when the at least one password is received from the user during SCM for the at least one dialogue, deactivating the SCM for the at least one dialogue, wherein the deactivation of the SCM causes the at least one dialogue to be unhidden and displayed on the client computer; and
        when the received at least one password is determined to include a symbol that indicates a time duration for unhiding and displaying the at least one dialogue, automatically re-hiding the at least one dialogue after expiration of the time duration.

9. The system of claim 8, wherein the at least one dialogue is selected by opening at least one of an existing dialogue or a new dialogue between the user and the at least one contact of the user.

10. The system of claim 8, wherein the client computer performs further actions, comprising:
    providing a list of previous dialogues to the user; and
    receiving the user's selection of at least one of the previous dialogues in the list.

11. The system of claim 8, wherein the client computer performs further actions, comprising, automatically re-activating the SCM for the at least one dialogue and re-hiding the at least one dialogue after expiration of a pre-set time duration.

12. The system of claim 8, wherein the client computer performs further actions, comprising, displaying a notification that received password is valid regardless of whether the received password is valid or invalid.

13. The system of claim 8, wherein the client computer performs further actions, comprising:
    receiving a message associated with the at least one dialogue in SCM;
    generating a notification for the message based on information that is different than information included in the message; and
    providing the notification to the user.

14. The system of claim 8, wherein the client computer performs further actions, comprising, hiding display of the at least one contact in a contact list during SCM.

15. A network computer that is improved to manage messaging for a user of a client computer, comprising:
    a memory for storing instructions; and
    a processor that executes the instructions to perform actions, including
        determining at least one contact of the user and at least one dialogue between the user and the at least one contact that are selected by the user;
        determining at least one password for the at least one dialogue that is set by the user;
        when the at least one password for the at least one dialogue is received from the user, activating a secret chat mode (SCM) for the at least one dialogue, wherein at least one of the at least one dialogue or the at least one contact is selectively hidden from display on the client computer;
        when the at least one password is received from the user during SCM for the at least one dialogue, deactivating the SCM for the at least one dialogue, wherein the deactivation of the SCM causes the at least one dialogue to be unhidden and displayed on the client computer; and
        when the received at least one password is determined to include a symbol that indicates a time duration for unhiding and displaying the at least one dialogue, automatically re-hiding the at least one dialogue after expiration of the time duration.

16. The network computer of claim 15, wherein the at least one dialogue is selected by opening at least one of an existing dialogue or a new dialogue between the user and the at least one contact of the user.

17. The network computer of claim 15, wherein the processor executes the instructions to perform further actions, comprising:
    providing a list of previous dialogues to the user; and
    receiving the user's selection of at least one of the previous dialogues in the list.

18. The network computer of claim 15, wherein the processor executes the instructions to perform further actions, comprising, automatically re-activating the SCM for the at least one dialogue and re-hiding the at least one dialogue after expiration of a pre-set time duration.

19. The network computer of claim 15, wherein the processor executes the instructions to perform further actions, comprising, displaying a notification that received password is valid regardless of whether the received password is valid or invalid.

20. The network computer of claim 15, wherein the processor executes the instructions to perform further actions, comprising:
    receiving a message associated with the at least one dialogue in SCM;
    generating a notification for the message based on information that is different than information included in the message; and
    providing the notification to the user.

21. A processor readable non-transitory storage media that includes instructions for improving a client computer's management of messaging for a user, wherein execution of the instructions by a processor enables actions, comprising:
    determining at least one contact of the user and at least one dialogue between the user and the at least one contact that are selected by the user;
    determining at least one password for the at least one dialogue that is set by the user;
    when the at least one password for the at least one dialogue is received from the user, activating a secret chat mode (SCM) for the at least one dialogue, wherein at least one of the at least one dialogue or the at least one contact is selectively hidden from display on the client computer;

when the at least one password is received from the user during SCM for the at least one dialogue, deactivating the SCM for the at least one dialogue, wherein the deactivation of the SCM causes the at least one dialogue to be unhidden and displayed on the client computer, and when the received at least one password is determined to include a symbol that indicates a time duration for unhiding and displaying the at least one dialogue, automatically re-hiding the at least one dialogue after expiration of the time duration.

22. The media of claim 21, wherein the at least one dialogue is selected by opening at least one of an existing dialogue or a new dialogue between the user and the at least one contact of the user.

23. The media of claim 21, further comprising:
providing a list of previous dialogues to the user; and
receiving the user's selection of at least one of the previous dialogues in the list.

24. The media of claim 21, further comprising, automatically re-activating the SCM for the at least one dialogue and re-hiding the at least one dialogue after expiration of a pre-set time duration.

25. The media of claim 21, further comprising, displaying a notification that received password is valid regardless of whether the received password is valid or invalid.

26. The media of claim 21, further comprising:
receiving a message associated with the at least one dialogue in SCM;
generating a notification for the message based on information that is different than information included in the message; and
providing the notification to the user.

* * * * *